United States Patent [19]

Hayashi et al.

[11] Patent Number: 5,750,250
[45] Date of Patent: May 12, 1998

[54] HEMATITE PARTICLES AND MAGNETIC RECORDING MEDIUM HAVING A NON-MAGNETIC UNDER-COAT LAYER CONTAINING HEMATITE ($FE_2O_3$) PARTICLES.

[75] Inventors: Kazuyuki Hayashi; Keisuke Iwasaki; Yasuyuki Tanaka; Hiroko Morii, all of Hiroshima-ken, Japan

[73] Assignee: Toda Kogyo Corporation, Japan

[21] Appl. No.: 733,790

[22] Filed: Oct. 18, 1996

[30] Foreign Application Priority Data

Oct. 20, 1995 [JP] Japan .................................. 7-297852

[51] Int. Cl.⁶ .................................................. G11B 5/708
[52] U.S. Cl. .......................... 428/328; 428/329; 428/336; 428/402; 428/403; 428/694 BA; 428/694 BS; 428/900; 423/633; 106/304
[58] Field of Search .......................... 428/402, 403, 428/328, 329, 336, 694 BA, 694 BS, 900; 423/633; 106/304

[56] References Cited

U.S. PATENT DOCUMENTS

| | | | |
|---|---|---|---|
| 5,489,466 | 2/1996 | Inaba et al. | 428/212 |
| 5,496,622 | 3/1996 | Isobe et al. | 428/216 |
| 5,587,232 | 12/1996 | Hayashi et al. | 428/323 |
| 5,604,015 | 2/1997 | Hayashi et al. | 428/144 |

FOREIGN PATENT DOCUMENTS

| | | |
|---|---|---|
| 0 582 472 A1 | 2/1994 | European Pat. Off. |
| 0 660 309 A1 | 6/1995 | European Pat. Off. |

*Primary Examiner*—Stevan A. Resan
*Attorney, Agent, or Firm*—Nixon & Vanderhye

[57] ABSTRACT

Hematite particles for a non-magnetic undercoat layer for a magnetic recording medium, comprise: high-density acicular hematite particles having an average major axial diameter of not more than 0.3 μm, a major axial diameter distribution in geometrical standard of not more than 1.50 and a BET specific surface area of not less than 35 $m^2/g$, showing a pH of not less than 8, and containing not more than 300 ppm of soluble sodium salt, calculated as Na, and not more than 150 ppm of soluble sulfate, calculated as $SO_4$.

20 Claims, No Drawings ness and the coercive force are
HEMATITE PARTICLES AND MAGNETIC RECORDING MEDIUM HAVING A NON-MAGNETIC UNDER-COAT LAYER CONTAINING HEMATITE (FE₂O₃) PARTICLES.

BACKGROUND OF THE INVENTION

The present invention relates to hematite particles suitable for a non-magnetic undercoat layer for a magnetic recording medium, a process for producing the same, a non-magnetic undercoat layer containing the hematite particles and a magnetic recording medium having the non-magnetic undercoat layer, and more particularly, to acicular hematite particles which have an excellent dispersibility, which contain little soluble sodium salt and soluble sulfate and which show a pH of not less than 8, a process for producing the same, a non-magnetic undercoat layer containing such hematite particles and a magnetic recording medium having such non-magnetic undercoat layer.

With a development of miniaturized and lightweight video or audio magnetic recording and reproducing apparatuses for long-time recording, magnetic recording media such as a magnetic tape and magnetic disk have been increasingly and strongly required to have a higher performance, namely, a higher recording density, higher output characteristic, in particular, an improved frequency characteristic and a lower noise level.

Various attempts have been made at both enhancing the properties of magnetic particles and reducing the thickness of a magnetic layer in order to improve these properties of a magnetic recording medium.

The enhancement of the properties of magnetic particles is first described.

The required properties of magnetic particles in order to satisfy the above-described demands on a magnetic recording medium are a high coercive force and a large saturation magnetization.

As magnetic particles suitable for high-output and high-density recording, acicular magnetic iron-based alloy particles, which are obtained by heat-treating acicular goethite particles or acicular hematite particles in a reducing gas, are widely known.

Although acicular magnetic iron-based alloy particles have a high coercive force and a large saturation magnetization, since the acicular magnetic iron-based alloy particles used for a magnetic recording medium are very fine particles having a particle size of not more than 1 μm, particularly, 0.01 to 0.3 μm, they easily corrode and the magnetic characteristics thereof are deteriorated, especially, the saturation magnetization and the coercive force are decreased.

Therefore, in order to maintain the characteristics of a magnetic recording medium which uses as magnetic particles magnetic iron-based alloy particles, over a long period, it is strongly demanded to suppress the corrosion of acicular magnetic iron-based alloy particles as much as possible.

A reduction in the thickness of a magnetic recording layer is now described.

Video tapes have recently been required more and more to have a higher picture quality, and the frequencies of carrier signals recorded in recent video tapes are higher than those recorded in conventional video tapes. In other words, the signals in the shortwave region have come to be used, and as a result, the magnetization depth from the surface of a magnetic tape has come to be remarkably small.

With respect to signals having a short wavelength, a reduction in the thickness of a magnetic recording layer is also strongly demanded in order to improve the high output characteristics, especially, the S/N ratio of a magnetic recording medium. This fact is described, for example, on page 312 of *Development of Magnetic Materials and Technique for High Dispersion of Magnetic Powder*, published by Sogo Gijutsu Center Co., Ltd. (1982), "... the conditions for high-density recording in a coated-layer type tape are that the noise level is low with respect to signals having a short wave-length and that the high output characteristics are maintained. To satisfy these conditions, it is necessary that the tape has large coercive force Hc and residual magnetization Br, ... and the coating film has a smaller thickness ...".

Development of a thinner film for a magnetic recording layer has caused some problems.

Firstly, it is necessary to make a magnetic recording layer smooth and to eliminate the non-uniformity of thickness. As well known, in order to obtain a smooth magnetic recording layer having a uniform thickness, the surface of the base film must also be smooth. This fact is described on pages. 180 and 181 of *Materials for Synthetic Technology-Causes of Abrasion of Magnetic Tape and Head Running System and Measures for Solving the Problem* (hereinunder referred to as "*Materials for Synthetic Technology*" (1987), published by the Publishing Department of Technology Information Center, "... the surface roughness of a hardened magnetic layer depends on the surface roughness of the base (back-surface roughness) so largely as to be approximately proportional, ... since the magnetic layer is formed on the base, the more smooth the surface of the base is, the more uniform and larger head output is obtained and the more the S/N ratio is improved".

Secondly, a problem in the strength of a base film has been caused by the reduction in the thickness of a base film in response to the demand for a thinner magnetic layer. This fact is described, for example, on page 77 of the above-described *Development of Magnetic Materials and Technique for High Dispersion of Magnetic Powder*, "... Higher recording density is a large problem assigned to the present magnetic tape. This is important to shorten the length of the tape for miniaturizing a cassette and to enable long-time recording. For this purpose, it is necessary to reduce the thickness of a film base ... With the tendency of reduction in the film thickness, the stiffness of the tape also reduces to such an extent as to make smooth running in a recorder difficult. Therefore, improvement of the stiffness of a video tape both in the machine direction and in the transverse direction is now strongly demanded ..."

Thirdly, there is a problem of too large a light transmittance caused by ultrafine magnetic particles and a thin magnetic layer. The running of a magnetic recording medium such as a magnetic tape, especially, a video tape is stopped when the video deck detects a portion of the magnetic recording medium at which the light transmittance is large. If the light transmittance of the whole part of a magnetic recording layer is made large by the production of a thinner magnetic recording medium or the ultrafine magnetic particles dispersed in the magnetic recording layer, it is difficult to detect the portion having a large light transmittance by a video deck. As a measure for reducing the light transmittance of the whole part of a magnetic recording layer, carbon black or the like is added to the magnetic recording layer. It is, therefore, essential to add carbon black or the like to a magnetic recording layer in the present video tapes.

However, addition of non-magnetic particles such as carbon black not only impairs the enhancement of the recording density but also reduces the magnetization depth from the surface of the magnetic tape. It is, therefore, unfavorable to add non-magnetic particles to a magnetic recording layer.

As a countermeasure, a magnetic recording medium having on a non-magnetic substrate at least one non-magnetic undercoat layer produced by dispersing non-magnetic particles such as hematite particles in order to reduce the light transmittance, and solve the problems such as a deterioration in the surface properties and the electromagnetic transducing characteristics, has been proposed and put to practical use (Japanese Patent Publication No. 6-93297 (1994), Japanese Patent Application Laid-Open (KOKAI) Nos. 62-159338 (1987), 63-187418 (1988), 4-167225 (1992), 4-325915 (1992), 5-73882 (1993), 5-182177 (1993), 5-347017 (1993), 6-60362 (1994), etc.)

Non-magnetic particles for a non-magnetic undercoat layer which are capable of providing a non-magnetic undercoat layer for a magnetic recording medium having an excellent surface smoothness and a high strength, when the non-magnetic particles are dispersed in a binder resin, which enable a thin magnetic recording layer having a small light transmittance, an excellent surface smoothness and a uniform thickness to be formed on the undercoat layer, and which are capable of suppressing a corrosion of the magnetic iron-based alloy particles which are dispersed in the magnetic recording layer, are now in the strongest demand, but no such non-magnetic particles have ever been obtained.

As described in Japanese Patent Application Laid-Open (KOKAI) No. 63-187418 (1988), it is reported that when hematite particles are used as non-magnetic particles for a non-magnetic undercoat layer, it is possible to enhance the surface smoothness and the strength of the non-magnetic undercoat layer, and that when a magnetic recording layer is formed on such a non-magnetic undercoat layer, the magnetic recording layer has a small transmittance, an excellent surface smoothness and a uniform thickness. However, the problem has been pointed out that after the production of the magnetic recording medium, the magnetic iron-based alloy particles which are dispersed in the magnetic recording layer corrode, thereby greatly reducing the magnetic characteristics.

Accordingly, it is strongly demanded to provide non-magnetic particles for a non-magnetic undercoat layer which are capable of improving the surface smoothness and the strength of the non-magnetic undercoat layer, which enable a thin magnetic recording layer having a small light transmittance, an excellent surface smoothness and a uniform thickness to be formed on the undercoat layer, and which are capable of suppressing the deterioration in the magnetic characteristics caused by a corrosion of the magnetic iron-based alloy particles which are dispersed in the magnetic recording layer.

As a result of studies undertaken by the present inventors to solve the above-described problems, it has been found that by dehydrating acicular goethite particles coated with a sintering preventive; heating the goethite particles at a temperature of not lower than 550° C. to obtain high-density acicular hematite particles; after slurrying the obtained high-density acicular hematite particles, pulverizing coarse particles of the high-density acicular hematite particles by wet-pulverization; and after adjusting a pH of the slurry to not less than 13, heat-treating the resultant slurry at a temperature of not lower than 80° C., the thus-obtained hematite particles have an excellent dispersibility in the resin binder, contain little soluble sodium salt and soluble sulfate, show a pH of not less than 8, and may be suitable for a non-magnetic undercoat layer for a magnetic recording medium which uses magnetic iron-based alloy particles for the magnetic layer. The present invention has been achieved on the basis of this finding.

SUMMARY OF THE INVENTION

In a first aspect of the present invention, there are provided hematite particles for a non-magnetic undercoat layer for a magnetic recording medium, comprising high-density acicular hematite particles having an average major axial diameter of not more than 0.3 μm, a major axial diameter distribution in geometrical standard of not more than 1.50 and a BET specific surface area of not less than 35 $m^2/g$, showing a pH of not less than 8, and containing not more than 300 ppm of soluble sodium salt (calculated as Na) and not more than 150 ppm of soluble sulfate (calculated as $SO_4$).

In a second aspect of the present invention, there is provided hematite particles for a non-magnetic undercoat layer for a magnetic recording medium, comprising: high-density acicular hematite particles having an average major axial diameter of not more than 0.3 μm, a major axial diameter distribution in geometrical standard of not more than 1.50 and a BET specific surface area of not less than 35 $m^2/g$, showing a pH of not less than 8, and containing not more than 300 ppm of soluble sodium salt, calculated as Na, and not more than 150 ppm of soluble sulfate, calculated as $SO_4$; and an aluminum oxide, an aluminum hydroxide, a silicon oxide, a silicon hydroxide or a mixture thereof coated on the surface of the high-density acicular hematite particles.

In a third aspect of the present invention, there is provided a non-magnetic undercoat layer for a magnetic recording medium having a magnetic recording layer containing magnetic iron-based alloy particles and formed on the non-magnetic substrate, comprising: hematite particles defined in the first aspect; and a binder resin.

In a fourth aspect of the present invention, there is provided a non-magnetic undercoat layer for a magnetic recording medium having a magnetic recording layer containing magnetic iron-based alloy particles and formed on the non-magnetic substrate, comprising: hematite particles defined in the second aspect; and a binder resin.

In a fifth aspect of the present invention, there is provided a magnetic recording medium comprising:
a non-magnetic substrate;
a non-magnetic undercoat layer defined in the third aspect which is formed on the said non-magnetic substrate; and
a magnetic recording layer containing magnetic iron-based alloy particles and a binder resin, and formed on the said non-magnetic undercoat layer.

In a sixth aspect of the present invention, there is provided a magnetic recording medium comprising:
a non-magnetic substrate;
a non-magnetic undercoat layer defined in the fourth aspect which is formed on the said non-magnetic substrate; and
a magnetic recording layer containing magnetic iron-based alloy particles and a binder resin, and formed on the said non-magnetic undercoat layer.

In a seventh aspect of the present invention, there is provided a process for producing hematite particles defined in first aspect, comprising the steps of:

dehydrating acicular goethite particles with the surfaces coated with a sintering preventive;

heating the said goethite particles at a temperature of not less than 550° C. to obtain high-density acicular hematite particles;

after slurrying the said high density acicular hematite particles, pulverizing coarse particles in the said high density acicular hematite particles by wet pulverization;

after adjusting a pH of the slurry to not less than 13, heat-treating the said hematite particles in the slurry at a temperature of not less than 80° C.; and filtering out, washing with water, and drying the said hematite particles.

In an eighth aspect of the present invention, there is provided a process for producing hematite particles defined in second aspect, comprising the steps of:

dehydrating acicular goethite particles with the surfaces coated with a sintering preventive;

heating the said goethite particles at a temperature of not less than 550° C. to obtain high-density acicular hematite particles;

after slurrying the said high density acicular hematite particles, pulverizing coarse particles in the said high density acicular hematite particles by wet pulverization;

after adjusting a pH of the slurry to not less than 13, heat-treating the said hematite particles in the slurry at a temperature of not less than 80° C.;

washing the thus-obtained hematite particles with water; and treating the thus-obtained hematite particles with an aqueous solution containing an aluminum compound, a silicon compound and both an aluminum compound and a silicon compound, thereby coating the surfaces of the said hematite particles with an aluminum oxide, a silicon oxide, an aluminum hydroxide, a silicon hydroxide, or a mixture thereof.

DETAILED DESCRIPTION OF THE INVENTION

The hematite particles for a non-magnetic-undercoat layer according to the present invention are high-density acicular hematite particles which have an average major axial diameter of not more than 0.3 µm, a major axial diameter distribution in geometrical standard of not more than 1.50 and a BET specific surface area of not less than 35 m$^2$/g, which show a pH of not less than 8, and which contain not more than 300 ppm of soluble sodium salt (calculated as Na) and not more than 150 ppm of soluble sulfate (calculated as SO$_4$), and if necessary, which are coated with aluminum oxide, silicon oxide, aluminum hydroxide, silicon hydroxide, or a mixture thereof.

The acicular hematite particles in the present invention have an aspect ratio [(average major axial diameter): (average minor axial diameter)], (hereinunder referred to merely as "aspect ratio") of not less than 2:1, preferably not less than 3:1. If the aspect ratio is less than 2:1, the strength of the coating film may lower. The upper limit of the aspect ratio is 20:1, preferably 10:1 in consideration of the dispersibility in the vehicle. The acicular particles here may have not only an acicular shape but also a spindle shape, a grain shape (rugby-ball shape) or the like.

The average major axial diameter of hematite particles according to the present invention is preferably 0.005 to 0.3 µm. If the average major axial diameter of hematite particles is less than 0.005 µm, the dispersion in the vehicle may be unfavorably difficult. On the other hand, if the average major axial diameter exceeds 0.3 µm, the particle size is so large as to impair the surface smoothness. In consideration of the dispersibility in the vehicle and the surface smoothness of the coated film, the more preferable average major axial diameter is 0.02 to 0.2 µm.

The average minor axial diameter of hematite particles according to the present invention is 0.0025 to 0.15 µm. If the average minor axial diameter of hematite particles is less than 0.0025 µm, the dispersion in the vehicle may be unfavorably difficult. On the other hand if the average minor axial diameter exceeds 0.15 µm, the particle size is so large as to impair the surface smoothness. In consideration of the dispersibility in the vehicle and the surface smoothness of the coated film, the more preferable average minor axial diameter is 0.01 to 0.1 µm.

The degree of densification ($S_{BET}/S_{TEM}$) of hematite particles is represented by the ratio of the specific surface area ($S_{BET}$) measured by a BET method and the surface area ($S_{TEM}$) calculated from the major axial diameter and the minor axial diameter which were measured from the particles in an electron micrograph.

The $S_{BET}/S_{TEM}$ value of hematite particles according to the present invention is preferably 0.5 to 2.5. If the $S_{BET}/S_{TEM}$ value is less than 0.5, although the hematite particles have been densified, the particles may adhere to each other due to sintering therebetween, and the particle size may increase, so that a sufficient surface smoothness of the coated film may be not obtained. On the other hand, if the $S_{BET}/S_{TEM}$ value exceeds 2.5, the densification may be not sufficient, so that there may be many pores in the surfaces of particles and the dispersibility in the vehicle may become insufficient. In consideration of the surface smoothness of the coated film and the dispersibility in the vehicle, the $S_{BET}/S_{TEM}$ value is more preferably 0.7 to 2.0, even more preferably 0.8 to 1.6.

The particle size distribution calculated from the major axial diameters in geometrical standard deviation is not more than 1.50. If it exceeds 1.50, the coarse particles exert deleterious influence on the surface smoothness of the coated film. If the surface smoothness of the coated film is taken into consideration, the particle size distribution is preferably not more than 1.40, more preferably not more than 1.35. If the industrial productivity is taken into consideration, the lower limit of the particle size distribution of the hematite particle calculated from the major axial diameters is 1.01 in geometrical standard.

The BET specific surface area of the hematite particles of the present invention is not less than 35 m$^2$/g. If it is less than 35 m$^2$/g, the particle size of the hematite particles is larger and the particles adhere to each other due to sintering therebetween, so that the surface smoothness of the coating film is deteriorated. The BET specific surface area of the hematite particles of the present invention is preferably not less than 40 m$^2$/g, more preferably not less than 45 m$^2$/g. The upper limit of the BET specific surface area is preferably 150 m$^2$/g. In consideration of the dispersion property in the vehicle, the upper limit of the BET specific surface area is more preferably 100 m$^2$/g, even more preferably 80 m$^2$/g.

The pH of the hematite particles when suspended in an aqueous solution (concentration: 50 g/liter), is not less than 8. If it is less than 8, the magnetic iron-based alloy particles contained in the magnetic recording layer formed on the non-magnetic undercoat layer are gradually corroded, which leads to a deterioration in the magnetic characteristics. In consideration of a corrosion preventive effect on the magnetic iron-based alloy particles, the pH of the hematite particles is preferably not less than 8.5, more preferably not less than 9.0. The upper limit of the pH of the hematite particles is preferably 12, more preferably 11, even more preferably 10.5.

The content of soluble sodium salt in the hematite particles is not more than 300 ppm (calculated as Na). If it exceeds 300 ppm, the magnetic iron-based alloy particles contained in the magnetic recording layer formed on the non-magnetic undercoat layer are gradually corroded, thereby causing a deterioration in the magnetic characteristics. In addition, the dispersion property of the hematite particles in the vehicle is easily impaired, and the preservation of the magnetic recording medium is deteriorated and chalking is sometimes caused in a highly humid environment. In consideration of a corrosion preventive effect on the magnetic iron-based alloy particles, the content of soluble sodium salt is preferably not more than 250 ppm, more preferably not more than 200 ppm, even more preferably not more than 150 ppm. From the point of view of industry such as productivity, the lower limit thereof is about 0.01 ppm.

The content of soluble sulfate in the hematite particles is not more than 150 ppm (calculated as $SO_4$). If it exceeds 150 ppm, the magnetic iron-based alloy particles contained in the magnetic recording layer formed on the non-magnetic undercoat layer are gradually corroded, thereby causing a deterioration in the magnetic properties. In addition, the dispersion property of the hematite particles in the vehicle is easily impaired, and the preservation of the magnetic recording medium is deteriorated and chalking is sometimes caused in a highly humid environment. In consideration of a corrosion preventive effect on the magnetic iron-based alloy particles, the content of soluble sodium salt is preferably not more than 70 ppm, more preferably not more than 50 ppm. From the point of view of industry such as productivity, the lower limit thereof is about 0.01 ppm.

The surfaces of the hematite particles of the present invention may be coated with aluminum oxide, silicon oxide, aluminum hydroxide, silicon hydroxide or a mixture thereof, if necessary. When the acicular hematite particles coated with the above-described coating material are dispersed in a vehicle, they have an affinity with the binder resin and it is easy to obtain a desired dispersibility.

The amount of aluminum or silicon used as the coating material is preferably 0.01 to 50 wt % (calculated as Al or $SiO_2$). If it is less than 0.01 wt %, the addition of the coating material hardly exerts a dispersibility-improving effect. If the amount exceeds 50.00 wt %, a compound which is free without coating the particle surfaces unfavorably exists. From the point of view of dispersibility in the vehicle, the more preferable amount of coating material is 0.05 to 20 wt %.

The non-magnetic undercoat layer of the present invention disposed on a non-magnetic substrate and composed of a coating film composition which contains non-magnetic particles and a binder resin is produced by forming a coating film on the non-magnetic substrate and drying the coating film. The coating film is formed by coating the surface of the non-magnetic substrate with a non-magnetic coating film composition which contains: a binder resin, a solvent and acicular hematite particles having an average major axial diameter of not more than 0.3 µm, a major axial diameter distribution in geometrical standard of not more than 1.50 and a BET specific surface area of not less than 35 m²/g, showing a pH of not less than 8, containing not more than 300 ppm of soluble sodium salt (calculated as Na) and not more than 150 ppm of soluble sulfate (calculated as $SO_4$) and, if necessary, coated with aluminum oxide, silicon oxide, aluminum hydroxide, silicon hydroxide or a mixture thereof.

It is possible to add a lubricant, a polishing agent, an antistatic agent, etc. which are generally used for the production of a magnetic recording medium to the non-magnetic undercoat layer.

As the non-magnetic substrate, the following materials which are at present generally used for the production of a magnetic recording medium are usable: a synthetic resin film such as polyethylene terephthalate, polyethylene, polypropylene, polycarbonate, polyethylene naphthalate, polyamide, polyamideimide and polyimide; foil and plate of a metal such as aluminum and stainless steel; and various kinds of paper. The thickness of the non-magnetic substrate is ordinarily about 1 to 50 µm.

The thickness of the non-magnetic undercoat layer obtained by coating a non-magnetic substrate with the coating film composition and drying the coating film is 0.2 to 10.0 µm. If the thickness is less than 0.2 µm, not only is it impossible to ameliorate the surface roughness of the base film but also the strength is insufficient. In order to obtain a magnetic recording medium having a thin layer, the upper limit of the thickness of the undercoat layer is preferably about 10.0 µm, and the thickness of the non-magnetic undercoat layer is more preferably 0.5 to 5.0 µm.

As the binder resin in the present invention, the following resins which are at present generally used for the production of a magnetic recording medium are usable: vinyl chloride-vinyl acetate copolymer, urethane resin, vinyl chloride-vinyl acetate urethane maleate elastomer, butadieneacrylonitrile copolymer, polyvinyl butyral, cellulose derivative such as nitrocellulose, polyester resin, synthetic rubber resin such as polybutadiene, epoxy resin, polyamide resin, polyisocyanate polymer, electron radiation-curing acryl urethane resin and mixtures thereof. Each of these resin binders may contain a polar group such as —OH, —COOH, —$SO_3M$, —$OPO_2M_2$ and —$NH_2$, wherein M represents H, Na or K.

The mixing ratio of the acicular hematite particles with the binder resin is 5 to 2000 parts by weight, preferably 100 to 1000 parts by weight based on 100 parts by weight of the binder resin.

The magnetic recording medium of the present invention which comprises (1) a non-magnetic substrate, (2) a non-magnetic undercoat layer disposed on the non-magnetic substrate and composed of: a binder resin and acicular hematite particles having an average major axial diameter of not more than 0.3 µm, a major axial diameter distribution in geometrical standard of not more than 1.50 and a BET specific surface area of not less than 35 m²/g, showing a pH of not less than 8, containing not more than 300 ppm of soluble sodium salt (calculated as Na) and not more than 150 ppm of soluble sulfate (calculated as $SO_4$), and if necessary, coated with aluminum oxide, silicon oxide, aluminum hydroxide, silicon hydroxide or a mixture thereof, and (3) a magnetic recording layer disposed on the non-magnetic undercoat layer and composed of at least magnetic iron-based alloy particles and a binder resin, is produced by coating on the non-magnetic undercoat layer formed on the non-magnetic substrate with a coating film composition containing at least magnetic iron-based alloy particles, a binder resin and a solvent, drying the obtained coating film to form a magnetic recording layer.

It is possible to add a lubricant, a polishing agent, an antistatic agent, etc. which are generally used for the production of a magnetic recording medium to the magnetic recording layer.

The acicular magnetic iron-based alloy particles have an average major axial diameter of 0.01 to 0.50 μm, preferably 0.03 to 0.30 μm, and an aspect ratio of not less than 3:1, preferably not less than 5:1. The upper limit of the aspect ratio is 15:1, preferably 10:1 in consideration of the dispersibility in the vehicle. The particles may have not only an acicular shape but also a spindle shape, a strip shape, a grain shape (rugby-ball shape) or the like.

The particles comprises 50 to 99 wt %, preferably 60 to 95 wt % of iron, and they may further contain other elements such as Co, Al, Ni, Zn, P, Si, B, Nd, La and Y.

As to the magnetic characteristics of the magnetic iron-based alloy particles, the coercive force is preferably 1200 to 3200 Oe, more preferably 1500 to 2500 Oe, and the saturation magnetization is preferably 100 to 170 emu/g, more preferably 130 to 150 emu/g in consideration of the properties such as high-density recording.

As the binder resin for the magnetic recording layer, it is also possible to use the same binder resin as that used for forming the non-magnetic undercoat layer.

The thickness of the magnetic recording layer after the film coating composition is applied to the non-magnetic undercoat layer and dried, is in the range of 0.01 to 5.0 μm. If the thickness is less than 0.01 μm, the uniform coating is difficult, so that unfavorable phenomenon such as unevenness on the coating surface is observed. On the other hand, when the thickness exceeds 5.0 μm, it is difficult to obtain desired signal recording property due to an influence of diamagnetism. The preferable thickness is in the range of 0.05 to 1.0 μm.

The mixing ratio of the acicular magnetic iron-based alloy particles with the binder resin in the magnetic recording layer is 200 to 2000 parts by weight, preferably 300 to 1500 parts by weight based on 100 parts by weight of the binder resin.

The process for producing the acicular hematite particles according to the present invention is now described.

Acicular goethite particles of precursors for the acicular hematite particles of the present invention are produced by an ordinary method:

(1) A method of oxidizing a suspension containing colloidal ferrous hydroxide and having a pH of not less than 11 which is obtained by adding not less than an equivalent of an alkali hydroxide solution to an aqueous ferrous salt solution, by passing an oxygen-containing gas thereinto at a temperature of not higher than 80° C.

(2) A method of producing spindle-shaped goethite particles by oxidizing a suspension containing $FeCO_3$ which is obtained by reacting an aqueous ferrous salt solution with an aqueous alkali carbonate solution, by passing an oxygen-containing gas thereinto, after aging the suspension, if necessary.

(3) A method of generating acicular seed goethite particles by oxidizing a ferrous salt solution containing colloidal ferrous hydroxide which is obtained by adding less than an equivalent of an alkali hydroxide solution or an alkali carbonate solution to an aqueous ferrous salt solution, by passing an oxygen-containing gas thereinto; adding not less than an equivalent of an alkali hydroxide solution to the $Fe^{2+}$ in the aqueous ferrous salt solution, to the aqueous ferrous salt solution containing the acicular goethite seed particles; and growing the acicular seed goethite particles by passing an oxygen-containing gas into the aqueous ferrous salt solution.

(4) A method of generating acicular seed goethite particles by oxidizing a ferrous salt solution containing colloidal ferrous hydroxide which is obtained by adding less than an equivalent of an alkali hydroxide solution or an alkali carbonate solution to an aqueous ferrous salt solution, by passing an oxygen-containing gas thereinto; and growing the acicular seed goethite particles in an acidic or neutral region.

The precursor particles obtained are heated and dehydrated.

Elements other than Fe such as Ni, Zn, P, Si and Al which are generally added in order to enhance various properties of the particles such as the major axial diameter, the minor axial diameter and the aspect ratio, may be added during the reaction for producing the goethite particles. The acicular goethite particles obtained generally contain 300 to 1500 ppm of soluble sodium salt (calculated as Na) and 100 to 3000 ppm of soluble sulfate (calculated as $SO_4$), and the BET specific surface area thereof is about 50 to 250 $m^2/g$.

The hematite particles of the present invention are obtained by heating and dehydrating the acicular goethite particles, and heat-treating the resulting particles at a temperature as high as not lower than 550° C. for the purpose of densification.

It is necessary to coat the particles with a sintering preventive prior to the heat-treatment at a high temperature. The acicular goethite particles coated with a sintering preventive generally contain 500 to 2000 ppm of soluble sodium salt (calculated as Na) and 300 to 3000 ppm of soluble sulfate (calculated as $SO_4$), and the BET specific surface area is about 50 to 250 $m^2/g$. The coating treatment using a sintering preventive comprises the steps of: (I) adding a sintering preventive to an aqueous suspension containing the acicular goethite particles or the acicular hematite particles obtained by heating and dehydrating the acicular goethite particles; (ii) mixing and stirring the suspension; (iii) filtering out the particles; (iv) washing the particles with water; and (v) drying the particles.

As the sintering preventive, sintering preventives generally used are usable: for example, P compounds such as sodium hexametaphosphate, polyphospholic acid and orthophosphoric acid; Si compounds such as water glass #3, sodium orthosilicate, sodium metasilicate and colloidal silica; B compounds such as boric acid; Al compounds including Al salts such as aluminum acetate, aluminum sulfate, aluminum chloride and aluminum nitrate, and alkali aluminate such as soda aluminate; and Ti compounds such as titanyl sulfate.

The acicular goethite particles coated with a sintering preventive are heated at a temperature as low as 250° to 400° C., and dehydrated so as to obtain low-density acicular hematite particles. The low-density hematite particles generally contain 500 to 2000 ppm of soluble sodium salt (calculated as Na) and 300 to 4000 ppm of soluble sulfate (calculated as $SO_4$), and the BET specific surface area is about 70 to 350 $m^2/g$. The low-density hematite particles are then heated at a temperature as high as 550° to 850° C. so as to obtain high-density acicular hematite particles. The high-density acicular hematite particles generally contain 500 to 4000 ppm of soluble sodium salt (calculated as Na)

and 300 to 5000 ppm of soluble sulfate (calculated as $SO_4$), and the BET specific surface area is about 35 to 150 $m^2$/g.

If the temperature of the low temperature heat-treatment of the goethite particles is lower than 250° C., the dehydration reaction takes a long time. On the other hand, if the temperature exceeds 400° C., the dehydration reaction is abruptly brought out, so that it is difficult to retain the shapes of the particles or sintering between particles is caused.

The acicular hematite particles obtained by the heat-treatment at a low temperature are low-density particles having a large number of pores in the surfaces of the dehydrated goethite particles. The BET specific surface area of the low-density hematite particles is about 1.2 to 2 times that of the acicular goethite particles as the precursors.

If the temperature of the high temperature heat-treatment of the low-density hematite particles is lower than 550° C., since the densification is insufficient, a large number of dehydration pores exist within and on the surfaces of the hematite particles, so that the dispersion in the vehicle is insufficient, and when the non-magnetic undercoat layer is formed from these particles, it is difficult to obtain a coated film having a smooth surface. On the other hand, if the temperature exceeds 850° C., although the densification of the hematite particles is sufficient, since sintering is caused on and between particles, the particle size increases, which also makes it difficult to obtain a coated film having a smooth surface.

The high-density acicular hematite particles are pulverized into coarse particles by a dry process, and formed into a slurry. The slurry is then pulverized by a wet process so as to remove coarse particles. In the wet pulverization, ball mill, sand grinder, Daino mill, colloid mill or the like is used and coarse particles having a particle size of not less than 44 µm are removed (pulverized). It is preferred that the amount of the remaining coarse particles having a particle size of not less than 44 µm in the slurry is not more than 10 wt %, more preferably 0 wt %. If the coarse particles having a particle size of not less than 44 µm remain, the effect of treating the particles in an aqueous alkali solution at the next step is not obtained.

The acicular hematite particles with coarse particles removed therefrom are slurried in an aqueous alkali solution of a pH of not less than 13 and the obtained slurry is heat-treated at a temperature of not lower than 80° C.

The concentration of the acicular hematite particles in the aqueous alkali solution is preferably 50 to 250 g/liter.

If the pH of the aqueous alkali solution containing the acicular hematite particles is less than 13, it is difficult to effectively remove the solid crosslinking caused by the sintering preventive which exists on the surfaces of the hematite particles, so that it is difficult to wash out the soluble sodium salt, soluble sulfate, etc. existing within and on the surfaces of the particles. The upper limit of the pH is about 14. In consideration of the effect of removing the solid crosslinking caused by the sintering preventive which exists on the surfaces of the hematite particles, the effect of washing out the soluble sodium slat, soluble sulfate, etc., and the effect of removing the alkali which adheres to the surfaces of hematite particles in the process of treatment with the aqueous alkali solution, the preferable pH is in the range of 13.1 to 13.8.

The heating temperature in the aqueous alkali suspension is preferably 80° to 103° C., more preferably 90° to 100° C. If the temperature is lower than 80° C., it is difficult to effectively remove the solid crosslinking caused by the sintering preventive which exists on the surfaces of the hematite particles. If the heating temperature exceeds 103° C., although it is possible to effectively remove the solid crosslinking, since an autoclave is necessary or the treated solution boils under a normal pressure, it is not advantageous from the point of view of industry.

The acicular hematite particles heat-treated in the aqueous alkali suspension are thereafter filtered out and washed with water by an ordinary method so as to remove the soluble sodium salt and soluble sulfate which are washed out of the interiors and the surfaces of the particles and to remove the alkali adhered to the surfaces of the hematite particles in the process of treatment with the aqueous alkali solution, and then dried.

As the method of washing the hematite particles with water, a method generally industrially used such as a decantation method, a dilution method using a filter thickener and a method of passing water into a filter press is adopted.

The acicular hematite particles of the present invention are filtered out and washed with water by an ordinary method after the hematite particles are heat-treated in the aqueous alkali suspension. The acicular hematite particles are then coated with aluminum oxide, silicon oxide, aluminum hydroxide, silicon hydroxide or a mixture thereof, if necessary.

If the soluble sodium salt and soluble sulfate which are contained within the high-density hematite particles are washed out with water, even if soluble sodium salt and soluble sulfate adhere to the surfaces when the surfaces of the hematite particles are coated with a coating material, the soluble sodium salt and soluble sulfate can be easily removed by water washing.

In order to coat the hematite particles, after the acicular hematite particles are heat-treated in the aqueous alkali suspension, the treated hematite particles are filtered out and washed with water by an ordinary method, and then are dispersed in an aqueous solution to obtain a suspension. An aluminum compound, a silicon compound, or both aluminum and silicon compounds are added to the resultant suspension and the pH thereof is adjusted. The acicular particles thus coated with the coating material are then filtered out, washed with water, dried and pulverized. The obtained hematite particles may be further deaerated and compacted, if necessary.

As the aluminum compound, the same aluminum compound as that used as the sintering preventive is usable.

As the silicon compound, the same silicon compound as that used as the sintering preventive is usable.

The amount of aluminum compound added is 0.01 to 50.00 wt % (calculated as Al) based on the weight of the acicular hematite particles. If the amount is less than 0.01 wt %, the dispersibility in the vehicle is insufficient. On the other hand, if the amount exceeds 50.00 wt %, it is unfavorable because the free aluminum compounds without coating the surfaces of the particles interact.

The amount of silicon compound added is 0.01 to 50.00 wt % (calculated as $SiO_2$) based on the weight of the acicular hematite particles. If the amount is less than 0.01 wt %, the dispersibility in the vehicle is insufficient. On the other hand, if the amount exceeds 50.00 wt %, it is unfavorable because the free silicon compounds without coating the surfaces of the particles interact.

When both an aluminum compound and a silicon compound are used, the amount thereof used is preferably 0.01 to 50.00 wt % (calculated as Al and $SiO_2$) based on the weight of the acicular hematite particles.

What is the most important in the present invention is the fact that when the high-density hematite particles which have an excellent dispersibility in the binder resin, which contain not more than 300 ppm of soluble sodium salt (calculated as Na) and not more than 150 ppm of soluble sulfate (calculated as $SO_4$), and which show the pH of not less than 8, are used as the non-magnetic particles for a non-magnetic undercoat layer, it is possible to enhance the surface smoothness and the strength of the non-magnetic undercoat layer owing to the excellent dispersibility in the binder resin, and that when a magnetic recording layer is formed on the non-magnetic undercoat layer, it is possible to reduce the light transmittance of the magnetic recording layer, thereby forming a smooth and uniform thin film, and suppressing a deterioration in the magnetic characteristics caused by the corrosion of the magnetic iron-based alloy particles which are dispersed in the magnetic recording layer.

The reason why the surface smoothness and the strength of the non-magnetic undercoat layer are enhanced is considered by the present inventors to be as follows. Since it is possible to sufficiently remove the soluble sodium and the soluble sulfate, which agglomerate high-density hematite particles by firmly crosslinking, the agglomerates are separated into substantially discrete particles by washing the particles with water, so that acicular hematite particles having an excellent dispersion in the vehicle are obtained.

This fact will be explained in the following.

The goethite particles used as the precursors are produced by various methods, as described above. When the main material for producing acicular goethite particles are ferrous sulfate in any method, a large amount of sulfate $[SO_4^{2-}]$ naturally exists.

Especially, when goethite particles are produced from an acidic solution, since water-soluble sulfate such as $Na_2SO_4$ is simultaneously produced and an alkali metal such as $K^+$, $NH_4^+$ and $Na^+$ are contained, a precipitate containing an alkali metal and a sulfate is easily produced. This precipitate is represented by $RFe_3(SO_4)(OH)_6$ (wherein R=$K^+$, $NH_4^+$, $Na^+$). Such a precipitate is a slightly soluble sulfuric acid containing salt and cannot be removed by an ordinary water washing method. This slightly soluble salt becomes a soluble sulfate or a soluble sodium salt in the next heat-treatment step. The soluble sulfate and soluble sodium salt are firmly connected with the interiors or the surfaces of the acicular hematite particles by a sintering preventive which is essential for preventing the deformation of the acicular hematite particles and sintering between particles in the heat treatment at a high temperature for the densification of the particles and which is crosslinking the acicular hematite particles. In this manner, the agglomeration between acicular hematite particles becomes further firmer. As a result, the soluble sulfate and the soluble sodium salt, especially, imprisoned in the interiors of the particles or the agglomerates become very difficult to remove by an ordinary water washing method.

When the acicular goethite particles are produced in an alkali solution by using ferrous sulfate and sodium hydroxide, $Na_2SO_4$ is simultaneously produced as a sulfate and NaOH exists in the mother liquor. Since they are both soluble, if the acicular goethite particles are adequately washed with water, $Na_2SO_4$ and NaOH ought to be removed. However, since the crystallinity of acicular goethite particles is generally small, the water washing effect is poor, and when the particles are washed with water by an ordinary method, the particles still contain water-soluble contents such as a soluble sulfate $[SO_4^{2-}]$ and a soluble sodium salt $[Na^+]$. The water-soluble contents are firmly connected with the interiors or the surfaces of the acicular hematite particles by the sintering preventive crosslinking the particles, as described above, and the agglomeration between acicular hematite particles becomes further firmer. As a result, the soluble sulfate and the soluble sodium salt, especially, imprisoned in the interiors of the particles or the agglomerates become very difficult to remove by an ordinary water washing method.

It is considered that when the high-density hematite particles in which the soluble sulfate and the soluble sodium salt are firmly connected with the interiors or the surfaces of the particles via the sintering preventive, as described above, are pulverized by a wet-process to remove coarse particles, and adjusting a pH of the aqueous suspension of the hematite particles to not less than 13, heat-treated in the aqueous alkali suspension at a temperature of not lower than 80° C., the aqueous alkali solution sufficiently permeates into the interiors of the high-density hematite particles, so that the binding force of the sintering preventive which is firmly connected with the interiors and the surfaces of the particles and the interiors of the agglomerates is gradually weakened and is separated from the interiors and the surfaces of the particles and the interiors of the agglomerates, and simultaneously, the water-soluble sodium salt and the water-soluble sulfate are easily removed by water washing.

It is considered by the present inventors that because the contents of the soluble sodium salt and the soluble sulfate which accelerate the corrosion of a metal, in the high-density hematite particles are small and the pH of the hematite particles is as high as not less than 8, a deterioration in the magnetic characteristics caused by the corrosion of the magnetic iron-based alloy particles which are dispersed in the magnetic recording layer is suppressed.

Actually, the present inventors confirmed that a progress of corrosion of magnetic iron-based alloy particles is suppressed by a synergistic effect of a small soluble content and a pH of the hematite particles of not less than 8, from the fact that the advantages of the present invention are not produced in any of the cases of (1) after adjusting a pH of the suspension of the high-density hematite particles to less than 13, heat-treating the high-density hematite particles after wet-pulverization at a temperature of not lower than 80° C., (2) after adjusting a pH of the suspension of the high-density hematite particles to not less than 13, heat-treating the high-density hematite particles after wet-pulverization at a temperature of lower than 80° C., and (3) after adjusting a pH of the suspension of the high-density hematite particles without being pulverized by a wet process to not less than 13, heat-treating the high-density hematite particles containing coarse particles at a temperature of not lower than 80° C., as shown in later-described examples and comparative examples.

The gloss (at 45°) of the non-magnetic undercoat layer containing acicular hematite particles according to the present invention is 190 to 280%, preferably 195 to 280%, more preferably 200 to 280% and the surface roughness Ra thereof is 2.0 to 10.0 nm, preferably 2.0 to 9.0 nm, more preferably 2.0 to 8.0 nm.

The magnetic recording medium having a non-magnetic undercoat layer containing acicular hematite particles according to the present invention has a coercive force of 900 to 3500 Oe, preferably 1000 to 3500 Oe, more preferably 1500 to 3500 Oe; a Br/Bm (squareness=residual magnetic flux density (Br)/saturated magnetic flux density (Bm)) of 0.85 to 0.95, preferably 0.86 to 0.95; a gloss (at 45°) of 200 to 300%, preferably 210 to 300%; a surface roughness Ra of less than 10 nm, preferably 2.0 to 9.0 nm, more preferably 3.0 to 8.0 nm; a linear adsorption coefficient of 1.10 to 2.00 $\mu m^{-1}$, preferably 1.20 to 2.00 $\mu m^{-1}$; a corrosiveness represented by a percentage of change in the coercive force of not more than 10%; preferably not more than 9.5%; and a corrosiveness represented by a percentage of change in Bm of not more than 10%; preferably not more than 9.5%.

The acicular hematite particles for a non-magnetic undercoat layer according to the present invention have an excellent dispersibility in the vehicle, so that it is possible to produce a non-magnetic undercoat layer which is excellent in the strength and the surface property as a base film. When a magnetic recording medium is produced from the acicular hematite particles of the present invention, it is possible to obtain a magnetic recording layer having a small light transmittance and a smooth and uniform thin magnetic recording layer. In addition, owing to a small content of soluble Na salt and soluble sulfate in the acicular hematite particles and a pH of the acicular hematite particles of not less than 8, it is possible to suppress a deterioration in the magnetic characteristics, so that it is possible to maintain the properties as a magnetic recording medium over a long period.

EXAMPLES

The present invention is further described by the following examples, but these examples are merely intended to be illustrative and not to be construed as limiting the scope of the invention.

The average major axial diameter and the average minor axial diameter of the particles in each of the following examples and comparative examples are expressed by the average values of 350 particles in an electron microphotograph.

The aspect ratio was calculated from the following formula:

Aspect ratio=(average major axial diameter):(average minor axial diameter)

The particle size distribution of the particles is expressed by the geometrical standard deviation (σg) obtained by the following method. The major axial diameters of 350 particles in an electron microphotograph of 120,000 magnification were measured. The actual major axial diameters of the particles and the accumulative number of particles were obtained from the calculation on the basis of the measured values. In logarithmico-normal probability paper, the major axial diameters were plotted at desired intervals on the abscissa-axis and the accumulative number of particles belonging to each interval of the major axial diameters was plotted by percentage on the ordinate-axis by a statistical technique. The major axial diameters corresponding to the number of particles of 50% and 84.13%, respectively, were read from the graph, and the geometrical standard deviation (σg) was determinated from the following formula:

Geometrical standard deviation (σg)=[major axial diameter (μm) (geometrical average diameter) corresponding to the accumulative number of particles of 84.13%]/[major axial diameter (μm) (geometrical average diameter) corresponding to the accumulative number of particles of 50%]

The smaller the geometrical standard deviation (σg), the more the particle size distribution of the major axial diameter of the particles is excellent.

The specific surface area is expressed by the value measured by a BET method.

The degree of densification of the hematite particles is represented by $S_{BET}/S_{TEM}$, where the $S_{BET}$ is a specific surface area measured by the above-described BET method, the $S_{TEM}$ is a value calculated from the average major axial diameter $l$ cm and the average minor axial diameter $w$ cm which were measured from the particles in an electron micrograph. The $S_{TEM}$ was calculated from the following formula on the assumption that a particle is a rectangular parallelepiped:

$$S_{TEM}(M^2/g)=[(4lw+2w^2)/(lw^2 \cdot \rho_p)] \times 10^{-4}$$

wherein $\rho_p$ is the true specific gravity and 5.2 g/cm$^3$ was used.

Since the $S_{TEM}$ is a specific surface area of a particle having a smooth surface without any dehydration pore within or on the surface thereof, the closer $S_{BET}/S_{TEM}$ of particles is to 1, the smoother surface the particles have without any dehydration pore within or on the surface thereof, in other words, the particles are high-density particles.

The amount of Al and the amount of SiO$_2$ were measured from fluorescent X-ray analysis.

The amount of the remaining coarse particles having a particle size of not less than 44 μm in the slurry after the wet-pulverization was measured in the following manner.

1) The concentration of the hematite particles in the slurry after the wet-pulverization was measured.
2) After mildly stirring the slurry containing 100 g of the hematite particles, the resulting slurry was subjected to sieving-treatment using a 325 mesh sieve (sieve opening: 44 μm), thereby obtaining particles which do not pass through the 325 mesh sieve.
3) After drying the weight of the obtained particles having a particle size of not less than 44 μm was determined.
4) By using the weight of the particles having a particle size of not less than 44 μm, the amount of the remaining coarse particles having a particle size of not less than 44 μm in the slurry after the wet-pulverization was calculated.

The contents of soluble sodium salt and soluble sulfate were measured by the following manner. 5g of the particles and 100 ml of purified water were weighed, added into an Erlenmeyer flask (capacity: 300 ml), heated till boiling while unstoppering, and continued the boiling for 5 minutes. After stoppering, cooled to a room temperature. After unstoppering, purified water which was equivalent to the purified water lost by boiling was added into the Erlenmeyer flask. After stoppering, the contents of the Erlenmeyer flask was shaked for 1 minute and was allowed to stand for 5 minutes. The obtained supernatant solution was filtered using a No. 5C filter paper, and the sodium content and SO$_4^{2-}$ content in the obtained filtrate were measured by using an Inductively Coupled Plasma Atomic Emission Spectrophotometer SPS 4000 (manufactured by Seiko Instruments Inc.).

The pH of the particles were measured by using the filtrate obtained in the same way as in the measurement of the contents of soluble sodium salt and soluble sulfate in accordance with the method described in the item 7 of JIS Z8802.

The gloss of the coating film was measured at an angle of 45° by "Glossmeter UGV-5D (manufactured by Sugu Test Instrument Co., Ltd.).

The surface roughness Ra is expressed by the average value of the center-line average roughness of the profile curve of the surface of the coating film by using "Surfcom-575A" (manufactured by Tokyo Seimitsu Co., Ltd.).

The strength of the coating film was obtained by measuring the Young's modulus of the coating film by using "Autograph" (by Shimazu Seisakusho Corp.). The Young's modulus is represented by the relative value with that of a commercially available video tape "AV T-120" (manufactured by Victor Company of Japan, Ltd.). The higher the relative value, the higher the strength of the coating film.

The magnetic characteristics of the particles were measured under an external magnetic field of 10 kOe by "Vibration Sample Magnetometer VSM-3S-15 (manufactured by Toei Kogyo, Co., Ltd.).

In order to examine a change with the passage of time of a magnetic recording medium caused by the corrosion of the magnetic iron-based alloy particles in the magnetic recording layer, the magnetic recording medium was allowed to stand in an environment of a temperature of 60° C. and a relative humidity of 90% for 14 days, and the coercive force and the saturated magnetic flux density were measured before and after standing. A change in each property was divided by the value before standing, and represented by percentage.

The light transmittance of a magnetic sheet is expressed by the linear adsorption coefficient measured by using "Photoelectric Spectrophotometer UV-2100" (manufactured by Shimazu Seisakusho Corp.). The linear adsorption coefficient is represented by the following formula: The larger the value, the more difficult it is for the magnetic sheet to transmit light.

Linear adsorption coefficient ($\mu m^{-1}$)=ln (1/t)/FT wherein t denotes a light transmittance (%) at $\lambda$=900 nm, and FT denotes a thickness ($\mu m$) of the coating composition layer of the film used for the measurement.

The film thickness of the non-magnetic undercoat layer and the magnetic recording layer were measured in the following manner. The thickness ($h_0$) of a base film (non-magnetic substrate) was first measured by using a Contacting-type Coating Thickness Meter K-402B (manufactured by Anritsu Electric Co., Ltd.). The thickness ($h_1$) of a multilayered film obtained by forming a non-magnetic undercoat layer on the base film (non-magnetic substrate) was then measured. Similarly, the thickness ($h_2$) of a multilayered film obtained by forming a magnetic recording layer on the non-magnetic undercoat layer formed on the base film (non-magnetic substrate) was then measured.

The film thickness of the non-magnetic undercoat layer was calculated from $h_1-h_0$, and the film thickness of the magnetic recording layer was calculated from $h_2-h_1$.

The viscosity of the coating composition was measured at 25° C. by using Cone-Great type Viscosimeter EMD-R (manufactured by Tokyo Kasei Co., Ltd.) at a shear rate of D=1.92 l/sec.

<Acicular goethite particles>

The precursors 1 to 7 shown in Table 1 was produced as the precursor for producing acicular hematite particles.

Example 1

<Production of acicular hematite particles>

750 g of acicular goethite particles (average major axial diameter: 0.220 $\mu m$, average minor axial diameter: 0.0275 $\mu m$, aspect ratio: 8.00, BET specific surface area: 125 $m^2/g$, content of soluble sodium salt: 452 ppm (calculated as Na), content of soluble sulfate: 283 ppm (calculated as $SO_4$), pH: 7.1, geometrical standard deviation: 1.27) was suspended in water so as to obtain a slurry, and the concentration of the solid content was adjusted to 5 g/liter. 150 liter of the slurry was heated to 60° C. and the pH was adjusted to 9.0 by adding a 0.1-N aqueous NaOH solution.

To the alkali slurry was gradually added 22.5 g of water glass #3, and after the end of addition, the resultant mixture was aged for 60 minutes. The pH of the slurry was then adjusted to 6.0 by adding a 0.1-N acetic acid solution. Thereafter, the particles were filtered out, washed with water, dried and pulverized by an ordinary method, thereby producing acicular goethite particles coated with a silicon oxide. The $SiO_2$ content in the acicular goethite particles was 0.86 wt %.

700 g of the acicular goethite particles obtained were charged into a stainless steel rotary furnace, and heat-treated in the air at 300° C. for 60 minutes while rotating the furnace, and dehydrated to obtain low-density acicular hematite particles. The thus-obtained low-density acicular hematite particles had an average major axial diameter of 0.150 $\mu m$, an average minor axial diameter of 0.0216 $\mu m$, and an aspect ratio of 6.94. The BET specific surface area ($S_{BET}$) was 157.6 $m^2/g$, the degree of densification ($S_{BET}/S_{TEM}$) was 4.13. The content of soluble sodium salt of the goethite particles was 1183 ppm (calculated as Na) and the content of soluble sulfate was 1735 ppm (calculated as $SO_4$). The pH of the goethite particles was 6.3 and the geometrical standard deviation of the goethite particles was 1.32.

650g of the obtained low-density acicular hematite particles were then charged into a ceramic rotary furnace, and heat-treated in the air at 650° C. for 10 minutes while rotating the furnace to seal-treat dehydration pores. The thus-obtained high-density acicular hematite particles had an average major axial diameter of 0.148 $\mu m$, an average minor axial diameter of 0.0217 $\mu m$, and an aspect ratio of 6.82. The BET specific surface area ($S_{BET}$) was 53.1 $m^2/g$, the degree of densification ($S_{BET}/S_{TEM}$) was 1.40. The content of soluble sodium salt of the hematite particles was 1386 ppm (calculated as Na) and the content of soluble sulfate was 2739 ppm (calculated as $SO_4$). The pH was 5.6 and the geometrical standard deviation of the hematite particles was 1.34. The $SiO_2$ content in the hematite particles was 95 wt %.

After 600 g of the high-density hematite particles obtained were roughly pulverized by a Nara mill in advance, they were charged into 3.5 liter of purified water and peptized by a homomixer (manufactured by Tokushu-Kika Kogyo Co., Ltd.) for 60 minutes.

The obtained slurry of the high-density acicular hematite particles was then mixed and dispersed at an axial rotation frequency of 2000 rpm while being circulated by a horizontal SGM (Dispermat SL, manufactured by S. C. Adichem, Co., Ltd.). The acicular hematite particles in the slurry remaining on a 325 mesh sieve (sieve opening: 44 $\mu m$) was 0%.

The concentration of the high-density hematite particles in the slurry was adjusted to 100 g/liter, and 5 liter of the slurry was adjusted to pH 13.5 by adding 6N-aqueous NaOH solution. The resulting slurry was then heated to 95° C. under stirring, and was held for 3 hours at 95° C.

The resultant slurry was then washed with water by a decantation method and the pH of the slurry was adjusted to 10.5. The concentration of the slurry at this point was 96 g/liter.

The particles were filtered out through a Buchner filter, and the purified water was passed into the filtrate until the electric conductivity of the filtrate became not more than 30 $\mu s$. The particles were then dried by an ordinary method and pulverized to obtain the target acicular hematite particles. The acicular hematite particles obtained had an average major axial diameter of not more than 0.148 $\mu m$, a minor axial diameter of 0.0220 $\mu m$, and a specific ratio of 6.73. The geometric standard deviation $\sigma g$ of particle size (major axial diameter) was 1.33, the BET specific surface (SBET) was 52.5 m²/g, the degree $S_{BET}/S_{TEM}$ of densification was 1.40 and the pH was 9.2. They contained 144 ppm of soluble sodium salt and 20 ppm of soluble sulfate.

<Production of a non-magnetic undercoat layer>

12 g of the acicular hematite particles obtained were mixed with a binder resin solution (70 wt % of cyclohexanone and 30 wt % of a vinyl chloride-vinyl acetate copolymer resin having a sodium sulfonate group) and cyclohexanone to obtain a mixture having the solid content of 72 wt %, and kneaded the resulting mixture by a plastomill for 30 minutes. Thereafter, the obtained kneaded material was taken out, charged into a glass bottle (capacity: 140 ml) together with 95 g of glass beads of 1.5 mmϕ, a binder resin solution (70 wt % of a solvent (methylethyl ketone:toluene= 1:1) and 30 wt % of a polyurethane resin having a sodium sulfonate group), cyclohexanone, methylethyl ketone and toluene, mixed and dispersed by a paint shaker for 6 hours.

The final composition of the thus-obtained non-magnetic coating was as follows:

| | |
|---|---|
| Acicular hematite particles | 100 parts by weight |
| Vinyl chloride-vinyl acetate copolymer resin having a sodium sulfonate group | 10 parts by weight |
| Polyurethane resin having a sodium sulfonate group | 10 parts by weight |
| Cyclohexanone | 44.6 parts by weight |
| Methylethyl ketone | 111.4 parts by weight |
| Toluene | 66.9 parts by weight |

The non-magnetic hematite coating obtained was applied to a polyethylene terephthalate film of 14 μm thick to a thickness of 55 μm by an applicator, and the film was then dried, thereby forming a non-magnetic undercoat layer.

The gloss of the non-magnetic undercoat layer was 197%, the surface roughness Ra was 6.8 nm, and the Young's modulus (relative value) was 120.

<Production of a magnetic recording medium>

12 g of acicular magnetic iron-based alloy particles (average major axial diameter: 0.11 μm, average minor axial diameter: 0.018 μm, aspect ratio: 6.1:1, coercive force: 1820 Oe, saturation magnetization: 135 emu/g), 1.2 g of a polishing agent (AKP-30, produced by Sumitomo Chemical Corporation), 0.36 g of carbon black (#3250B, produced by Mitsubishi Chemical Corporation), a binder resin solution (70 wt % of cyclohexanone and 30 wt % of a vinyl chloride-vinyl acetate copolymer resin having a sodium sulfonate group), and cyclohexanone were mixed, thereby obtaining a mixture having the solid content of 78 wt %, and kneaded the resulting mixture by a plastomill for 30 minutes. Thereafter, the obtained kneaded material was taken out, charged into a glass bottle (capacity: 140 ml) together with 95 g of glass beads of 1.5 mmϕ, a binder resin solution (70 wt % of a solvent (methylethyl ketone:toluene=1:1) and 30 wt % of a polyurethane resin having a sodium sulfonate group), cyclohexanone, methylethyl ketone and toluene, mixed and dispersed by a paint shaker for 6 hours.

A lubricant and a curing agent were further added, and the resultant mixture was further mixed and dispersed for 15 minutes. The composition of the thus-obtained magnetic coating was as follows:

| | |
|---|---|
| Magnetic iron-based alloy particles | 100 parts by weight |
| Vinyl chloride-vinyl acetate copolymer resin having a sodium sulfonate group | 10 parts by weight |
| Polyurethane resin having a sodium sulfonate group | 10 parts by weight |
| Polishing agent (AKP-30, produced by Sumitomo Chemical Corp.) | 10 parts by weight |
| Carbon black #3250B (produced by Mitsubishi Chemical Corp.) | 3.0 parts by weight |
| Lubricant (myristic acid: butyl stearate = 1:2) | 3.0 parts by weight |
| Curing agent (polyisocyanate) | 5 parts by weight |
| Cyclohexanone | 65.8 parts by weight |
| Methylethyl ketone | 164.5 parts by weight |
| Toluene | 98.7 parts by weight |

The magnetic paint obtained was applied to the non-magnetic undercoat layer to a thickness of 15 μm by an applicator, and the magnetic coating obtained was oriented and dried in a magnetic field, and then calendered. The magnetic coating was then subjected to a curing reaction at 60° C. for 24 hours, and thereafter slit into a width of 0.5 inch, thereby obtaining a magnetic tape.

The coercive force Hc of the magnetic tape obtained was 1862 Oe, the squareness 0.86, the gloss 235%, the surface roughness Ra 5.8 nm, the Young's modulus (relative value) 133, and the linear absorption coefficient 1.23. Changes with the passage of time in the coercive force and the saturation magnetic flux density were 6.8%, and 5.8%, respectively.

<Production of low-density acicular hematite particles>

Examples 2 to 16, Comparative Examples 1 to 14

Low-density acicular hematite particles were obtained in the same way as in Example 1 except for varying the kind of acicular goethite particles as the precursors, the kind and amount of sintering preventive, and heating and dehydration temperature and time. The physical properties of the acicular goethite particles as the precursors are shown in Table 1.

The main producing conditions and various properties are shown in Tables 2 and 3.

<Production of high-density acicular hematite particles>

Examples 17 to 31, Comparative Examples 15 to 27

High-density acicular hematite particles were obtained in the same way as in Example 1 except for varying the kind of particles being treated, and the heating time and temperature for densification.

The main producing conditions and various properties are shown in Tables 4 and 5.

<Treatment of acicular hematite particles in an aqueous alkali solution>

Examples 32 to 46, Comparative Examples 28 to 35

Acicular hematite particles were obtained in the same way as in Example 1 except for varying the kind of acicular hematite particles, whether or not the wet pulverization process was included, whether or not the heat treatment was included, the pH value, and the heating time and temperature for densification.

The main producing conditions and various properties are shown in Tables 6 and 7.

<Surface coating of acicular hematite particles>

Example 47

The concentration of the slurry having a pH 10.5 which was obtained in Example 32 by washing the particles with water by a decantation method after heat-treatment in an aqueous alkali solution was 96 g/liter. 5 liter of the slurry was reheated to 60° C., and 533 ml (equivalent to 3.0 wt % calculated as Al based on the acicular hematite particles) of 1.0-N $NaAlO_2$ solution was added to the slurry, and the mixture was held for 30 minutes. Thereafter, the pH of the mixture was adjusted to 8.5 by using acetic acid. The particles were then filtered out, washed with water, dried and pulverized in the same way as in Example 1, thereby obtaining acicular hematite particles coated with a coating material.

The main producing conditions and various properties are shown in Table 8.

Examples 48 to 61

Acicular hematite particles were obtained in the same way as in Example 47 except for varying the kind of acicular hematite particles, and the kind and the amount of surface treating material.

The main producing conditions and various properties are shown in Table 8.

<Production of a non-magnetic undercoat layer>

Examples 62 to 91, Comparative Examples 36 to 50

A non-magnetic undercoat layer was obtained in the same way as in Example 1 by using the acicular hematite particles obtained in Examples 32 to 61, Comparative Examples 1 to 3, 15 to 18, 23 and 28 to 35.

The main producing conditions and various properties are shown in Tables 9 to 11.

<Production of a magnetic recording medium using magnetic iron-based alloy particles>

Examples 92 to 121, Comparative Examples 51 to 65

A magnetic recording medium using magnetic iron-based alloy particles was obtained in the same way as in Example 1 except for varying 62 to 91 and Comparative Examples 36 to 50 and the kind of magnetic iron-based alloy particles.

The main producing conditions and various properties are shown in Tables 12 to 14.

TABLE 1

| Kind of precursors | Acicular goethite particles | | |
|---|---|---|---|
| | Production method | Average major axial diameter (μm) | Aspect ratio (—) | BET specific surface area (m²/g) |
| Precursor 1 | Process(B) | 0.241 | 8.31 | 112 |
| Precursor 2 | Process(B) | 0.182 | 7.80 | 153 |
| Precursor 3 | Process(D) | 0.293 | 9.03 | 79 |
| Precursor 4 | Process(C) | 0.250 | 9.82 | 96 |
| Precursor 5 | Process(B) | 0.161 | 7.51 | 180 |
| Precursor 6 | Process(B) | 0.241 | 8.51 | 107 |
| Precursor 7 | Process(A) | 0.290 | 9.12 | 88 |

TABLE 1-continued

| Kind of precursors | Acicular goethite particles | | | |
|---|---|---|---|---|
| | Soluble Na salt (ppm) | Soluble sulfate (ppm) | pH (—) | Geometric standard deviation σg (—) |
| Precursor 1 | 440 | 295 | 7.3 | 1.25 |
| Precursor 2 | 360 | 683 | 7.1 | 1.27 |
| Precursor 3 | 981 | 2703 | 5.6 | 1.30 |
| Precursor 4 | 565 | 1201 | 7.5 | 1.30 |
| Precursor 5 | 381 | 268 | 7.0 | 1.25 |
| Precursor 6 | 401 | 269 | 7.5 | 1.23 |
| Precursor 7 | 1385 | 165 | 8.4 | 1.36 |

TABLE 2

| | Kind of acicular goethite particles | Sintering preventive | | Heating and dehydration | |
|---|---|---|---|---|---|
| | | Kind | Amount added (wt %) | Temperature (°C.) | Time (min.) |
| Ex. 2 | Particles produced in Example 1 | Phosphoric acid | 5.0 | 350 | 60 |
| Ex. 3 | Precursor 1 | Water glass #3 | 5.0 | 300 | 60 |
| Ex. 4 | Precursor 1 | Water glass #3 | 1.0 | 310 | 30 |
| | | Phosphoric acid | 1.5 | | |
| Ex. 5 | Precursor 2 | Phosphoric acid | 3.0 | 330 | 30 |
| Ex. 6 | Precursor 2 | Boric acid | 7.0 | 340 | 60 |
| Ex. 7 | Precursor 3 | Soda hexametaphosphate | 1.5 | 300 | 45 |
| Ex. 8 | Precursor 3 | Sodium aluminate | 5.0 | 300 | 30 |
| Ex. 9 | Precursor 4 | Water glass #3 | 1.0 | 300 | 15 |
| Ex. 10 | Precursor 4 | Titanyl sulfate | 6.0 | 340 | 30 |
| Ex. 11 | Precursor 5 | Sodium aluminate | 10.0 | 300 | 60 |
| Ex. 12 | Precursor 5 | Water glass #3 | 3.0 | 340 | 60 |
| | | Phosphoric acid | 2.0 | | |
| Ex. 13 | Precursor 6 | Water glass #3 | 3.5 | 320 | 30 |
| Ex. 14 | Precursor 6 | Water glass #3 | 2.0 | 340 | 30 |
| | | Sodium aluminate | 1.0 | | |
| Ex. 15 | Precursor 7 | Water glass #3 | 3.0 | 320 | 30 |
| Ex. 16 | Precursor 7 | Phosphoric acid | 3.0 | 340 | 30 |

| | Heated and dehydrated acicular hematite particles | | | | |
|---|---|---|---|---|---|
| | Average major axial diameter (μm) | Geometric standard deviation σg (—) | Average minor axial diameter (μm) | Aspect ratio (—) | $S_{BET}$ (m²/g) |
| Ex. 2 | 0.159 | 1.33 | 0.0223 | 7.13 | 150.0 |
| Ex. 3 | 0.178 | 1.26 | 0.0252 | 7.06 | 168.0 |
| Ex. 4 | 0.176 | 1.27 | 0.0249 | 7.07 | 154.6 |
| Ex. 5 | 0.133 | 1.35 | 0.0189 | 7.04 | 234.1 |
| Ex. 6 | 0.122 | 1.40 | 0.0189 | 6.46 | 222.3 |
| Ex. 7 | 0.242 | 1.37 | 0.0289 | 8.37 | 117.2 |
| Ex. 8 | 0.224 | 1.37 | 0.0286 | 7.83 | 120.9 |
| Ex. 9 | 0.188 | 1.28 | 0.0238 | 7.90 | 130.6 |
| Ex. 10 | 0.172 | 1.30 | 0.0237 | 7.26 | 115.2 |
| Ex. 11 | 0.115 | 1.45 | 0.0153 | 7.52 | 279.6 |
| Ex. 12 | 0.119 | 1.40 | 0.0156 | 7.63 | 243.8 |
| Ex. 13 | 0.196 | 1.25 | 0.0289 | 6.78 | 176.5 |
| Ex. 14 | 0.213 | 1.26 | 0.0300 | 7.10 | 166.2 |
| Ex. 15 | 0.239 | 1.42 | 0.0271 | 8.82 | 110.0 |
| Ex. 16 | 0.239 | 1.39 | 0.0276 | 8.66 | 98.3 |

TABLE 2-continued

| | Heated and dehydrated acicular hematite particles | | | | |
|---|---|---|---|---|---|
| | $S_{TEM}$ (m²/g) | $S_{BET}/S_{TEM}$ (—) | Soluble Na salt (ppm) | Soluble sulfate (ppm) | pH (—) |
| Ex. 2 | 36.9 | 4.06 | 1046 | 1832 | 6.7 |
| Ex. 3 | 32.7 | 5.14 | 1121 | 1765 | 6.3 |
| Ex. 4 | 33.1 | 4.67 | 1321 | 1683 | 6.2 |
| Ex. 5 | 43.6 | 5.37 | 832 | 1421 | 6.0 |
| Ex. 6 | 43.9 | 5.07 | 506 | 983 | 6.0 |
| Ex. 7 | 28.2 | 4.16 | 1015 | 2566 | 3.9 |
| Ex. 8 | 28.6 | 4.23 | 982 | 2123 | 3.9 |
| Ex. 9 | 34.4 | 3.80 | 992 | 1016 | 7.0 |
| Ex. 10 | 34.7 | 3.32 | 1101 | 1268 | 5.8 |
| Ex. 11 | 53.6 | 5.21 | 1256 | 2153 | 6.7 |
| Ex. 12 | 52.5 | 4.64 | 1321 | 2216 | 6.6 |
| Ex. 13 | 28.6 | 6.18 | 823 | 1416 | 5.9 |
| Ex. 14 | 27.4 | 6.06 | 926 | 1382 | 7.2 |
| Ex. 15 | 30.0 | 3.67 | 1585 | 396 | 8.8 |
| Ex. 16 | 29.5 | 3.33 | 1896 | 356 | 9.3 |

TABLE 3

| | Kind of acicular goethite particles | Sintering preventive | | Heating and dehydration | |
|---|---|---|---|---|---|
| | | Kind | Amount added (wt %) | Temperature (°C.) | time (min.) |
| Comp. Ex. 1 | Particles produced in Example 1 | — | — | 340 | 60 |
| Comp. Ex. 2 | Particles produced in Example 1 | — | — | 300 | 60 |
| Comp. Ex. 3 | Particles produced in Example 1 | Phosphoric acid | 2.0 | 340 | 30 |
| Comp. Ex. 4 | Particles produced in Example 1 | Water glass #3 | 2.0 | — | — |
| Comp. Ex. 5 | Particles produced in Example 1 | Phosphoric acid | 1.0 | 300 | 30 |
| Comp. Ex. 6 | Particles produced in Example 1 | Water glass #3 | 1.0 | 310 | 60 |
| Comp. Ex. 7 | Particles produced in Example 1 | Phosphoric acid | 1.0 | 330 | 60 |
| Comp. Ex. 8 | Particles produced in Example 1 | Phosphoric acid | 2.0 | 320 | 30 |
| Comp. Ex. 9 | Particles produced in Example 1 | Water glass #3 | 3.0 | 340 | 60 |
| Comp. Ex. 10 | Precursor 6 | Phosphoric acid | 2.5 | 330 | 30 |
| Comp. Ex. 11 | Precursor 6 | Phosphoric acid | 2.0 | 335 | 50 |
| Comp. Ex. 12 | Precursor 6 | Sodium aluminate | 3.0 | 315 | 25 |
| Comp. Ex. 13 | Precursor 6 | Water glass #3 | 1.0 | 340 | 50 |
| Comp. Ex. 14 | Precursor 6 | Phosphoric acid | 1.5 | 320 | 60 |

TABLE 3-continued

| | Heated and dehydrated acicular hematite particles | | | | |
|---|---|---|---|---|---|
| | Average major axial diameter (μm) | Geometric standard deviation σg (—) | Average minor axial diameter (μm) | Aspect ratio (—) | $S_{BET}$ (m²/g) |
| Comp. Ex. 1 | 0.148 | 1.36 | 0.0221 | 6.70 | 131.6 |
| Comp. Ex. 2 | 0.149 | 1.34 | 0.0217 | 6.87 | 148.6 |
| Comp. Ex. 3 | 0.157 | 1.33 | 0.0222 | 7.07 | 153.6 |
| Comp. Ex. 4 | — | — | — | — | — |
| Comp. Ex. 5 | 0.159 | 1.32 | 0.0223 | 7.13 | 161.6 |
| Comp. Ex. 6 | 0.155 | 1.32 | 0.0222 | 6.98 | 155.2 |
| Comp. Ex. 7 | 0.153 | 1.34 | 0.0222 | 6.89 | 153.6 |
| Comp. Ex. 8 | 0.158 | 1.33 | 0.0223 | 7.09 | 158.6 |
| Comp. Ex. 9 | 0.160 | 1.32 | 0.0223 | 7.17 | 160.1 |
| Comp. Ex. 10 | 0.200 | 1.30 | 0.0282 | 7.09 | 168.8 |
| Comp. Ex. 11 | 0.208 | 1.32 | 0.0287 | 7.25 | 169.9 |
| Comp. Ex. 12 | 0.196 | 1.33 | 0.0282 | 6.95 | 170.1 |
| Comp. Ex. 13 | 0.192 | 1.30 | 0.0281 | 6.83 | 156.5 |
| Comp. Ex. 14 | 0.204 | 1.33 | 0.0286 | 7.13 | 148.3 |

| | Heated and dehydrated acicular hematite particles | | | | |
|---|---|---|---|---|---|
| | $S_{TEM}$ (m²/g) | $S_{BET}/S_{TEM}$ (—) | Soluble Na salt (ppm) | Soluble sulfate (ppm) | pH (—) |
| Comp. Ex. 1 | 37.4 | 3.52 | 865 | 1101 | 7.0 |
| Comp. Ex. 2 | 38.0 | 3.91 | 785 | 965 | 7.2 |
| Comp. Ex. 3 | 37.1 | 4.14 | 1021 | 1656 | 6.8 |
| Comp. Ex. 4 | — | — | — | — | — |
| Comp. Ex. 5 | 36.9 | 4.38 | 998 | 1362 | 7.0 |
| Comp. Ex. 6 | 37.1 | 4.18 | 1125 | 1665 | 6.6 |
| Comp. Ex. 7 | 37.2 | 4.13 | 1083 | 1783 | 6.8 |
| Comp. Ex. 8 | 36.9 | 4.29 | 1123 | 1806 | 6.9 |
| Comp. Ex. 9 | 36.9 | 4.34 | 1583 | 1921 | 7.2 |
| Comp. Ex. 10 | 29.2 | 5.78 | 1856 | 1621 | 6.6 |
| Comp. Ex. 11 | 28.7 | 5.93 | 1732 | 1668 | 5.9 |
| Comp. Ex. 12 | 29.2 | 5.82 | 1482 | 1565 | 6.3 |
| Comp. Ex. 13 | 29.4 | 5.33 | 1216 | 1483 | 7.8 |
| Comp. Ex. 14 | 28.8 | 5.15 | 1232 | 1103 | 6.5 |

TABLE 4

| | Kind of low-density acicular hematite particles | Densification Temperature (°C.) | Densification Time (min.) | High-density acicular hematite particles Average major axial diameter (μm) | High-density acicular hematite particles Geometric standard deviation σg (—) |
|---|---|---|---|---|---|
| Ex. 17 | Ex. 2 | 720 | 15 | 0.141 | 1.35 |
| Ex. 18 | Ex. 3 | 680 | 15 | 0.162 | 1.27 |
| Ex. 19 | Ex. 4 | 650 | 10 | 0.160 | 1.29 |
| Ex. 20 | Ex. 5 | 680 | 10 | 0.121 | 1.35 |
| Ex. 21 | Ex. 6 | 730 | 15 | 0.109 | 1.34 |
| Ex. 22 | Ex. 7 | 600 | 20 | 0.220 | 1.35 |
| Ex. 23 | Ex. 8 | 560 | 20 | 0.201 | 1.37 |
| Ex. 24 | Ex. 9 | 550 | 15 | 0.173 | 1.28 |
| Ex. 25 | Ex. 10 | 610 | 15 | 0.152 | 1.32 |
| Ex. 26 | Ex. 11 | 770 | 30 | 0.092 | 1.32 |
| Ex. 27 | Ex. 12 | 560 | 15 | 0.113 | 1.32 |
| Ex. 28 | Ex. 13 | 650 | 20 | 0.183 | 1.27 |
| Ex. 29 | Ex. 14 | 560 | 15 | 0.194 | 1.30 |
| Ex. 30 | Ex. 15 | 580 | 15 | 0.236 | 1.37 |
| Ex. 31 | Ex. 16 | 620 | 20 | 0.230 | 1.35 |

High-density acicular hematite particles

| | Average minor axial diameter (μm) | Aspect ratio (—) | $S_{BET}$ (m²/g) | $S_{TEM}$ (m²/g) |
|---|---|---|---|---|
| Ex. 17 | 0.0221 | 6.38 | 49.8 | 37.5 |
| Ex. 18 | 0.0252 | 6.43 | 47.2 | 32.9 |
| Ex. 19 | 0.0231 | 6.96 | 46.2 | 35.8 |
| Ex. 20 | 0.0200 | 6.05 | 57.5 | 41.6 |
| Ex. 21 | 0.0192 | 5.68 | 66.9 | 43.6 |
| Ex. 22 | 0.0273 | 8.06 | 44.1 | 29.9 |
| Ex. 23 | 0.0268 | 7.50 | 42.9 | 30.6 |
| Ex. 24 | 0.0229 | 7.55 | 52.1 | 35.8 |
| Ex. 25 | 0.0213 | 7.14 | 51.0 | 38.6 |
| Ex. 26 | 0.0172 | 5.35 | 57.4 | 48.9 |
| Ex. 27 | 0.0150 | 7.53 | 48.2 | 54.7 |
| Ex. 28 | 0.0283 | 6.47 | 45.8 | 29.3 |
| Ex. 29 | 0.0281 | 6.90 | 46.6 | 29.4 |
| Ex. 30 | 0.0270 | 8.74 | 46.3 | 30.1 |
| Ex. 31 | 0.0270 | 8.52 | 45.4 | 30.2 |

High-density acicular hematite particles

| | $S_{BET}/S_{TEM}$ (—) | Soluble Na salt (ppm) | Soluble sulfate (ppm) | pH (—) |
|---|---|---|---|---|
| Ex. 17 | 1.33 | 1446 | 3321 | 5.7 |
| Ex. 18 | 1.43 | 1588 | 3192 | 5.2 |
| Ex. 19 | 1.29 | 1521 | 3265 | 5.5 |
| Ex. 20 | 1.38 | 956 | 2168 | 5.1 |
| Ex. 21 | 1.53 | 685 | 1890 | 5.0 |
| Ex. 22 | 1.47 | 1325 | 4562 | 3.2 |
| Ex. 23 | 1.40 | 1216 | 3383 | 3.7 |
| Ex. 24 | 1.45 | 1126 | 1865 | 6.6 |
| Ex. 25 | 1.32 | 1583 | 3562 | 4.8 |
| Ex. 26 | 1.17 | 2268 | 2983 | 5.7 |
| Ex. 27 | 0.88 | 1662 | 3165 | 5.5 |
| Ex. 28 | 1.56 | 1085 | 3563 | 4.8 |
| Ex. 29 | 1.59 | 1260 | 1852 | 6.0 |
| Ex. 30 | 1.53 | 3580 | 672 | 8.3 |
| Ex. 31 | 1.50 | 3412 | 496 | 8.7 |

TABLE 5

| | Low-density acicular hematite or acicular goethite particles | Densification Temperature (°C.) | Densification Time (min.) | High-density acicular hematite particles Average major axial diameter (μm) | High-density acicular hematite particles Geometric standard deviation σg (—) |
|---|---|---|---|---|---|
| Comp. Ex. 15 | Particles produced in Example 1 | 630 | 10 | 0.082 | 2.26 |
| Comp. Ex. 16 | Comp. Ex. 2 | 610 | 10 | 0.112 | 1.87 |
| Comp. Ex. 17 | Comp. Ex. 4 | 650 | 15 | 0.146 | 1.60 |
| Comp. Ex. 18 | Comp. Ex. 5 | 630 | 20 | 0.145 | 1.36 |
| Comp. Ex. 19 | Comp. Ex. 6 | 560 | 15 | 0.146 | 1.33 |
| Comp. Ex. 20 | Comp. Ex. 7 | 610 | 10 | 0.143 | 1.34 |
| Comp. Ex. 21 | Comp. Ex. 8 | 630 | 15 | 0.141 | 1.35 |
| Comp. Ex. 22 | Comp. Ex. 9 | 530 | 18 | 0.148 | 1.33 |
| Comp. Ex. 23 | Comp. Ex. 10 | 650 | 15 | 0.186 | 1.33 |
| Comp. Ex. 24 | Comp. Ex. 11 | 630 | 10 | 0.188 | 1.35 |
| Comp. Ex. 25 | Comp. Ex. 12 | 610 | 15 | 0.190 | 1.36 |
| Comp. Ex. 26 | Comp. Ex. 13 | 730 | 20 | 0.178 | 1.33 |
| Comp. Ex. 27 | Comp. Ex. 14 | 430 | 20 | 0.199 | 1.33 |

High-density acicular hematite particles

| | Average minor axial diameter (μm) | Aspect ratio (—) | $S_{BET}$ (m²/g) | $S_{TEM}$ (m²/g) |
|---|---|---|---|---|
| Comp. Ex. 15 | 0.0300 | 2.73 | 9.7 | 30.3 |
| Comp. Ex. 16 | 0.0271 | 4.13 | 21.5 | 31.8 |
| Comp. Ex. 17 | 0.0228 | 6.40 | 46.8 | 36.4 |
| Comp. Ex. 18 | 0.0222 | 6.53 | 51.5 | 37.3 |
| Comp. Ex. 19 | 0.0218 | 6.70 | 55.1 | 37.9 |
| Comp. Ex. 20 | 0.0223 | 6.41 | 50.6 | 37.2 |
| Comp. Ex. 21 | 0.0221 | 6.38 | 48.2 | 37.5 |
| Comp. Ex. 22 | 0.0226 | 6.55 | 60.6 | 36.6 |
| Comp. Ex. 23 | 0.0281 | 6.62 | 43.8 | 29.4 |
| Comp. Ex. 24 | 0.0280 | 6.71 | 44.6 | 29.5 |
| Comp. Ex. 25 | 0.0280 | 6.79 | 48.1 | 29.5 |
| Comp. Ex. 26 | 0.0288 | 6.18 | 38.2 | 28.9 |
| Comp. Ex. 27 | 0.0279 | 7.13 | 68.6 | 29.5 |

TABLE 5-continued

| | High-density acicular hematite particles | | | |
|---|---|---|---|---|
| | $S_{BET}/S_{TEM}$ (—) | Soluble Na salt (ppm) | Soluble sulfate (pm) | pH (—) |
| Comp. Ex. 15 | 0.32 | 896 | 3202 | 5.6 |
| Comp. Ex. 16 | 0.68 | 1868 | 3321 | 5.5 |
| Comp. Ex. 17 | 1.29 | 1888 | 3365 | 5.7 |
| Comp. Ex. 18 | 1.38 | 1999 | 3512 | 5.1 |
| Comp. Ex. 19 | 1.45 | 1838 | 3362 | 5.4 |
| Comp. Ex. 20 | 1.36 | 1783 | 3465 | 5.6 |
| Comp. Ex. 21 | 1.28 | 1690 | 3503 | 5.8 |
| Comp. Ex. 22 | 1.65 | 1660 | 3282 | 5.2 |
| Comp. Ex. 23 | 1.49 | 1926 | 2265 | 5.1 |
| Comp. Ex. 24 | 1.51 | 1886 | 2562 | 5.3 |
| Comp. Ex. 25 | 1.63 | 1965 | 2321 | 5.6 |
| Comp. Ex. 26 | 1.32 | 1812 | 2265 | 5.4 |
| Comp. Ex. 27 | 2.33 | 1883 | 2280 | 5.2 |

TABLE 6

| Kind of high-density acicular hematite particles | Wet pulverization Yes or No | Wet pulverization Amount of residue on sieve (wt %) | Heat treatment with aqueous alkali solution pH value (—) | Heat treatment with aqueous alkali solution Temperature (°C.) | Heat treatment with aqueous alkali solution Time (min.) |
|---|---|---|---|---|---|
| Ex. 32 | Ex. 17 | Yes | 0 | 13.7 | 95 | 180 |
| Ex. 33 | Ex. 18 | Yes | 0 | 13.1 | 98 | 180 |
| Ex. 34 | Ex. 19 | Yes | 0 | 13.5 | 98 | 240 |
| Ex. 35 | Ex. 20 | Yes | 0 | 13.3 | 95 | 180 |
| Ex. 36 | Ex. 21 | Yes | 0 | 13.2 | 95 | 300 |
| Ex. 37 | Ex. 22 | Yes | 0 | 13.6 | 90 | 180 |
| Ex. 38 | Ex. 23 | Yes | 0 | 13.1 | 90 | 240 |
| Ex. 39 | Ex. 24 | Yes | 0 | 13.5 | 95 | 180 |
| Ex. 40 | Ex. 25 | Yes | 0 | 13.8 | 93 | 240 |
| Ex. 41 | Ex. 26 | Yes | 0 | 13.2 | 95 | 180 |
| Ex. 42 | Ex. 27 | Yes | 0 | 13.8 | 95 | 300 |
| Ex. 43 | Ex. 28 | Yes | 0 | 13.5 | 95 | 180 |
| Ex. 44 | Ex. 29 | Yes | 0 | 13.6 | 95 | 240 |
| Ex. 45 | Ex. 30 | Yes | 0 | 13.1 | 95 | 180 |
| Ex. 46 | Ex. 31 | Yes | 0 | 13.2 | 95 | 240 |

| | A hematite particles washed with water after heat treatment with aqueous alkali solution | | | | |
|---|---|---|---|---|---|
| | Average major axial diameter (μm) | Geometric standard deviation σg (—) | Average minor axial diameter (μm) | Aspect ratio (—) | $S_{BET}$ (m²/g) |
| Ex. 32 | 0.143 | 1.35 | 0.0220 | 6.50 | 50.2 |
| Ex. 33 | 0.163 | 1.28 | 0.0250 | 6.52 | 47.2 |
| Ex. 34 | 0.161 | 1.28 | 0.0230 | 7.00 | 46.6 |
| Ex. 35 | 0.121 | 1.35 | 0.0203 | 5.96 | 58.1 |
| Ex. 36 | 0.121 | 1.34 | 0.0192 | 6.30 | 67.3 |
| Ex. 37 | 0.213 | 1.34 | 0.0273 | 7.80 | 45.5 |

TABLE 6-continued

| Ex. 38 | 0.212 | 1.36 | 0.0272 | 7.79 | 43.9 |
|---|---|---|---|---|---|
| Ex. 39 | 0.173 | 1.28 | 0.0232 | 7.46 | 52.3 |
| Ex. 40 | 0.150 | 1.32 | 0.0225 | 6.67 | 53.1 |
| Ex. 41 | 0.092 | 1.32 | 0.0171 | 5.38 | 57.2 |
| Ex. 42 | 0.115 | 1.32 | 0.0151 | 7.62 | 49.6 |
| Ex. 43 | 0.183 | 1.27 | 0.0280 | 6.54 | 46.3 |
| Ex. 44 | 0.192 | 1.30 | 0.0281 | 6.83 | 45.8 |
| Ex. 45 | 0.235 | 1.36 | 0.0268 | 8.77 | 47.6 |
| Ex. 46 | 0.230 | 1.34 | 0.0267 | 8.61 | 45.8 |

| | A hematite particles washed with water after heat treatment with aqueous alkali solution | | | | |
|---|---|---|---|---|---|
| | $S_{TEM}$ (m²/g) | $S_{BET}/S_{TEM}$ (—) | Soluble Nasalt (ppm) | Soluble sulfate (ppm) | pH (—) |
| Ex. 32 | 37.7 | 1.33 | 149 | 25 | 9.1 |
| Ex. 33 | 33.1 | 1.43 | 126 | 20 | 9.0 |
| Ex. 34 | 35.8 | 1.30 | 146 | 13 | 9.8 |
| Ex. 35 | 41.1 | 1.41 | 112 | 20 | 9.4 |
| Ex. 36 | 43.2 | 1.55 | 142 | 18 | 9.7 |
| Ex. 37 | 30.0 | 1.52 | 78 | 12 | 9.2 |
| Ex. 38 | 30.1 | 1.46 | 182 | 8 | 9.5 |
| Ex. 39 | 35.4 | 1.48 | 131 | 3 | 9.0 |
| Ex. 40 | 36.8 | 1.44 | 86 | 21 | 9.2 |
| Ex. 41 | 49.2 | 1.16 | 136 | 16 | 9.2 |
| Ex. 42 | 54.3 | 0.91 | 142 | 8 | 9.8 |
| Ex. 43 | 29.6 | 1.56 | 168 | 38 | 8.9 |
| Ex. 44 | 29.4 | 1.56 | 125 | 36 | 9.4 |
| Ex. 45 | 30.3 | 1.57 | 130 | 23 | 9.6 |
| Ex. 46 | 30.5 | 1.50 | 113 | 21 | 9.2 |

TABLE 7

| Kind of acicular hematite particles | | Wet pulverization Yes or No | Wet pulverization Amount of residue on sieve (wt %) | Heat treatment with aqueous alkali solution pH value (—) | Heat treatment with aqueous alkali solution Temperature (°C.) | Heat treatment with aqueous alkali solution Time (min.) |
|---|---|---|---|---|---|---|
| Comp. Ex. 28 | Comp. Ex. 19 | Yes | 0 | — | — | — |
| Comp. Ex. 29 | Comp. Ex. 20 | Yes | 0 | 12.5 | 93 | 180 |
| Comp. Ex. 30 | Comp. Ex. 21 | Yes | 0 | 13.1 | 70 | 180 |
| Comp. Ex. 31 | Comp. Ex. 22 | No | 21.5 | 13.2 | 90 | 180 |
| Comp. Ex. 32 | Comp. Ex. 24 | No | 36.8 | 10.5 | 93 | 180 |
| Comp. Ex. 33 | Comp. Ex. 25 | No | 26.5 | 13.2 | 60 | 120 |
| Comp. Ex. 34 | Comp. Ex. 26 | No | 11.6 | 13.3 | 92 | 180 |
| Comp. Ex. 35 | Comp. Ex. 27 | Yes | 0 | 9.5 | 93 | 120 |

| | A hematite particles washed with water after heat treatment with aqueous alkali solution | | | | |
|---|---|---|---|---|---|
| | Average major axial diameter (μm) | Geometric standard deviation σg (—) | Average minor axial diameter (μm) | Aspect ratio (—) | $S_{BET}$ (m²/g) |
| Comp. Ex. 28 | 0.146 | 1.35 | 0.0219 | 6.67 | 54.3 |
| Comp. Ex. 29 | 0.143 | 1.34 | 0.0222 | 6.44 | 51.6 |
| Comp. Ex. 30 | 0.141 | 1.35 | 0.0221 | 6.68 | 48.3 |
| Comp. | 0.148 | 1.36 | 0.0226 | 6.55 | 60.3 |

TABLE 7-continued

| | | | | | |
|---|---|---|---|---|---|
| Ex. 31 | | | | | |
| Comp. Ex. 32 | 0.188 | 1.40 | 0.0280 | 6.71 | 44.8 |
| Comp. Ex. 33 | 0.189 | 1.41 | 0.0280 | 6.75 | 48.1 |
| Comp. Ex. 34 | 0.178 | 1.36 | 0.0286 | 6.22 | 38.5 |
| Comp. Ex. 35 | 0.198 | 1.32 | 0.0278 | 7.12 | 68.6 |

A hematite particles washed with water after heat treatment with aqueous alkali solution

| | $S_{TEM}$ (m²/g) | $S_{BET}/S_{TEM}$ (—) | Soluble Na salt (ppm) | Soluble sulfate (ppm) | pH (—) |
|---|---|---|---|---|---|
| Comp. Ex. 28 | 37.8 | 1.44 | 565 | 386 | 5.8 |
| Comp. Ex. 29 | 37.3 | 1.38 | 465 | 168 | 8.6 |
| Comp. Ex. 30 | 39.2 | 1.23 | 482 | 56 | 8.9 |
| Comp. Ex. 31 | 36.6 | 1.65 | 568 | 158 | 7.9 |
| Comp. Ex. 32 | 29.5 | 1.52 | 456 | 265 | 7.8 |
| Comp. Ex. 33 | 29.5 | 1.63 | 421 | 321 | 7.5 |
| Comp. Ex. 34 | 29.1 | 1.32 | 586 | 385 | 7.2 |
| Comp. Ex. 35 | 29.6 | 2.32 | 483 | 121 | 7.5 |

TABLE 8

| | Kind of acicular hematite particles treated with aqueous alkali solution | Surface treatment Kind | Amount added calculated as element (wt %) | Coating material Kind | Amount (wt %) |
|---|---|---|---|---|---|
| Ex. 47 | Ex. 32 | Sodium aluminate | 3.0 | Al | 2.91 |
| Ex. 48 | Ex. 33 | Sodium aluminate | 1.0 | Al | 1.00 |
| | | Water glass #3 | 1.0 | SiO₂ | 0.99 |
| Ex. 49 | Ex. 34 | Sodium aluminate | 5.0 | Al | 4.76 |
| Ex. 50 | Ex. 35 | Aluminum sulfate | 0.5 | Al | 0.50 |
| Ex. 51 | Ex. 36 | Sodium aluminate | 12.0 | Al | 11.71 |
| Ex. 52 | Ex. 37 | Water glass #3 | 1.0 | SiO₂ | 0.97 |
| Ex. 53 | Ex. 38 | Sodium aluminate | 13.0 | Al | 12.20 |
| | | Water glass #3 | 3.0 | SiO₂ | 2.59 |
| Ex. 54 | Ex. 39 | Sodium Aluminate | 2.0 | Al | 1.96 |
| Ex. 55 | Ex. 40 | Colloidal silica | 3.0 | SiO₂ | 2.90 |
| Ex. 56 | Ex. 41 | Sodium aluminate | 22.5 | Al | 22.38 |
| Ex. 57 | Ex. 42 | Sodium aluminate | 10.0 | Al | 9.93 |
| Ex. 58 | Ex. 43 | Water glass #3 | 0.5 | SiO₂ | 0.49 |
| Ex. 59 | Ex. 44 | Aluminum acetate | 5.0 | Al | 4.91 |
| Ex. 60 | Ex. 45 | Water glass #3 | 2.0 | SiO₂ | 1.95 |
| Ex. 61 | Ex. 46 | Sodium aluminate | 7.5 | Al | 6.98 |

Acicular hematite particles washed with water after surface treatment

| | Average major axial diameter (μm) | Geometric standard deviation σg (—) | Average minor axial diameter (μm) | Aspect ratio (—) | $S_{BET}$ (m²/g) |
|---|---|---|---|---|---|
| Ex. 47 | 0.141 | 1.35 | 0.0218 | 6.47 | 50.4 |
| Ex. 48 | 0.161 | 1.27 | 0.0251 | 6.41 | 48.6 |
| Ex. 49 | 0.161 | 1.29 | 0.0233 | 6.91 | 46.2 |
| Ex. 50 | 0.123 | 1.35 | 0.0202 | 6.09 | 57.0 |
| Ex. 51 | 0.119 | 1.34 | 0.0193 | 6.17 | 68.9 |
| Ex. 52 | 0.217 | 1.33 | 0.0274 | 7.92 | 46.6 |
| Ex. 53 | 0.209 | 1.35 | 0.0268 | 7.80 | 44.2 |
| Ex. 54 | 0.175 | 1.28 | 0.0229 | 7.64 | 51.6 |
| Ex. 55 | 0.153 | 1.32 | 0.0227 | 6.74 | 52.8 |
| Ex. 56 | 0.094 | 1.33 | 0.0168 | 5.60 | 59.1 |
| Ex. 57 | 0.118 | 1.32 | 0.0152 | 7.76 | 49.1 |
| Ex. 58 | 0.181 | 1.27 | 0.0283 | 6.40 | 46.0 |
| Ex. 59 | 0.192 | 1.30 | 0.0284 | 6.76 | 45.0 |
| Ex. 60 | 0.234 | 1.35 | 0.0266 | 8.80 | 48.8 |
| Ex. 61 | 0.231 | 1.34 | 0.0268 | 8.62 | 45.4 |

Acicular hematite particles washed with water after surface treatment

| | $S_{TEM}$ (m²/g) | $S_{BET}/S_{TEM}$ (—) | Soluble Na salt (ppm) | Soluble sulfate (ppm) | pH (—) |
|---|---|---|---|---|---|
| Ex. 47 | 38.0 | 1.33 | 145 | 23 | 9.6 |
| Ex. 48 | 33.0 | 1.47 | 78 | 13 | 9.3 |
| Ex. 49 | 35.4 | 1.31 | 136 | 15 | 9.8 |
| Ex. 50 | 41.2 | 1.38 | 96 | 25 | 9.1 |
| Ex. 51 | 43.1 | 1.60 | 126 | 18 | 9.6 |
| Ex. 52 | 29.8 | 1.56 | 56 | 3 | 9.1 |
| Ex. 53 | 30.5 | 1.45 | 146 | 26 | 9.0 |
| Ex. 54 | 35.8 | 1.44 | 121 | 16 | 9.2 |
| Ex. 55 | 36.4 | 1.45 | 78 | 25 | 9.3 |
| Ex. 56 | 49.9 | 1.18 | 128 | 6 | 9.4 |
| Ex. 57 | 53.9 | 0.91 | 138 | 3 | 9.8 |
| Ex. 58 | 29.3 | 1.57 | 143 | 48 | 8.9 |
| Ex. 59 | 29.1 | 1.55 | 189 | 28 | 9.5 |
| Ex. 60 | 30.6 | 1.59 | 126 | 20 | 9.4 |
| Ex. 61 | 30.4 | 1.49 | 106 | 13 | 9.0 |

TABLE 9

| | Production of non-magnetic coating | | | Non-magnetic undercoat layer | | | |
|---|---|---|---|---|---|---|---|
| | Kind of acicular hematite particles | Weight ratio of particles and resin (—) | Non-magnetic coating Viscosity (cp) | Thickness (μm) | Gloss (%) | Ra (nm) | Young's modulus (relative value) |
| Ex. 62 | Ex. 32 | 5.0 | 366 | 3.5 | 195 | 7.2 | 125 |
| Ex. 63 | Ex. 33 | 5.0 | 282 | 3.7 | 206 | 6.8 | 128 |
| Ex. 64 | Ex. 34 | 5.0 | 216 | 3.8 | 213 | 6.4 | 131 |
| Ex. 65 | Ex. 35 | 5.0 | 507 | 3.8 | 203 | 6.8 | 121 |
| Ex. 66 | Ex. 36 | 5.0 | 595 | 4.0 | 196 | 6.8 | 118 |
| Ex. 67 | Ex. 37 | 5.0 | 512 | 3.6 | 189 | 7.4 | 135 |
| Ex. 68 | Ex. 38 | 5.0 | 336 | 3.8 | 192 | 8.0 | 143 |
| Ex. 69 | Ex. 39 | 5.0 | 282 | 3.6 | 201 | 7.0 | 135 |
| Ex. 70 | Ex. 40 | 5.0 | 216 | 3.2 | 193 | 8.2 | 131 |
| Ex. 71 | Ex. 41 | 5.0 | 170 | 3.2 | 210 | 6.6 | 113 |
| Ex. 72 | Ex. 42 | 5.0 | 537 | 4.0 | 213 | 6.0 | 118 |
| Ex. 73 | Ex. 43 | 5.0 | 307 | 3.8 | 211 | 8.4 | 128 |
| Ex. 74 | Ex. 44 | 5.0 | 794 | 4.2 | 201 | 8.6 | 130 |
| Ex. 75 | Ex. 45 | 5.0 | 606 | 3.9 | 191 | 9.6 | 140 |
| Ex. 76 | Ex. 46 | 5.0 | 521 | 3.9 | 196 | 9.0 | 145 |

TABLE 10

| | Production of non-magnetic coating | | | Non-magnetic undercoat layer | | | |
|---|---|---|---|---|---|---|---|
| | Kind of acicular hematite particles | Weight ratio of particles and resin (—) | Non-magnetic paint Viscosity (cp) | Thickness (μm) | Gloss (%) | Ra (nm) | Young's modulus (relative value) |
| Ex. 77 | Ex. 47 | 5.0 | 282 | 3.6 | 203 | 6.8 | 126 |
| Ex. 78 | Ex. 48 | 5.0 | 282 | 3.6 | 216 | 6.2 | 130 |
| Ex. 79 | Ex. 49 | 5.0 | 230 | 3.6 | 216 | 6.4 | 131 |
| Ex. 80 | Ex. 50 | 5.0 | 435 | 3.7 | 206 | 6.4 | 126 |
| Ex. 81 | Ex. 51 | 5.0 | 461 | 3.7 | 210 | 6.2 | 120 |
| Ex. 82 | Ex. 52 | 5.0 | 410 | 3.6 | 196 | 7.0 | 138 |
| Ex. 83 | Ex. 53 | 5.0 | 307 | 3.5 | 194 | 7.6 | 142 |
| Ex. 84 | Ex. 54 | 5.0 | 282 | 3.3 | 206 | 6.8 | 136 |
| Ex. 85 | Ex. 55 | 5.0 | 205 | 3.6 | 195 | 7.6 | 133 |
| Ex. 86 | Ex. 56 | 5.0 | 128 | 3.8 | 216 | 6.0 | 120 |
| Ex. 87 | Ex. 57 | 5.0 | 435 | 3.6 | 222 | 5.6 | 120 |
| Ex. 88 | Ex. 58 | 5.0 | 333 | 3.7 | 213 | 6.4 | 131 |
| Ex. 89 | Ex. 59 | 5.0 | 614 | 3.8 | 206 | 6.8 | 135 |
| Ex. 90 | Ex. 60 | 5.0 | 498 | 3.9 | 198 | 8.8 | 138 |
| Ex. 91 | Ex. 61 | 5.0 | 463 | 3.9 | 204 | 8.2 | 140 |

TABLE 11

| | Production of non-magnetic paint | | | Non-magnetic undercoat layer | | | |
|---|---|---|---|---|---|---|---|
| | Kind of acicular hematite particles | Weight ratio of particles and resin (—) | Non-magnetic paint Viscosity (cp) | Thickness (μm) | Gloss (%) | Ra (nm) | Young's modulus (relative value) |
| Comp. Ex. 36 | Comp. Ex. 1 | 5.0 | 10240 | 4.8 | 68 | 78.2 | 65 |
| Comp. Ex. 37 | Comp. Ex. 15 | 5.0 | 216 | 3.8 | 80 | 56.2 | 73 |
| Comp. Ex. 38 | Comp. Ex. 16 | 5.0 | 128 | 3.6 | 98 | 41.4 | 68 |
| Comp. Ex. 39 | Comp. Ex. 3 | 5.0 | 19200 | 4.8 | 74 | 43.4 | 80 |
| Comp. Ex. 40 | Comp. Ex. 17 | 5.0 | 435 | 3.8 | 143 | 31.6 | 90 |
| Comp. | Comp. | 5.0 | 435 | 3.7 | 168 | 25.2 | 90 |

TABLE 11-continued

| | Production of non-magnetic paint | | | Non-magnetic undercoat layer | | | |
|---|---|---|---|---|---|---|---|
| | Kind of acicular hematite particles | Weight ratio of particles and resin (—) | Non-magnetic paint Viscosity (cp) | Thickness (μm) | Gloss (%) | Ra (nm) | Young's modulus (relative value) |
| Ex. 41 | Ex. 18 | | | | | | |
| Comp. Ex. 42 | Comp. Ex. 28 | 5.0 | 410 | 3.7 | 168 | 23.0 | 92 |
| Comp. Ex. 43 | Comp. Ex. 29 | 5.0 | 392 | 3.6 | 173 | 15.6 | 110 |
| Comp. Ex. 44 | Comp. Ex. 30 | 5.0 | 366 | 3.6 | 184 | 10.2 | 110 |
| Comp. Ex. 45 | Comp. Ex. 31 | 5.0 | 794 | 3.7 | 179 | 14.6 | 118 |
| Comp. Ex. 46 | Comp. Ex. 23 | 5.0 | 256 | 3.7 | 158 | 28.6 | 100 |
| Comp. Ex. 47 | Comp. Ex. 32 | 5.0 | 216 | 3.6 | 176 | 15.6 | 108 |
| Comp. Ex. 48 | Comp. Ex. 33 | 5.0 | 307 | 3.8 | 181 | 12.6 | 116 |
| Comp. Ex. 49 | Comp. Ex. 34 | 5.0 | 228 | 3.8 | 186 | 10.8 | 118 |
| Comp. Ex. 50 | Comp. Ex. 35 | 5.0 | 1024 | 4.0 | 168 | 11.6 | 118 |

TABLE 12

Magnetic recording medium using magnetic iron-based alloy particles

| | Kind of non-magnetic undercoat layer | Kind of magnetic iron-based alloy particles | Weight ratio of magnetic particles and resin (—) | Thickness of magnetic layer (μm) | Coercive force (Oe) | Br/Bm (—) | Gloss (%) | Ra (nm) | Young's modulus (relative value) | Linear absorption coefficient (μm$^{-1}$) | Corrosiveness Rate of change in coercive force (%) | Rate of change in Bm (%) |
|---|---|---|---|---|---|---|---|---|---|---|---|---|
| Ex. 92 | Ex. 62 | Major axial diameter = 0.11 μm Minor axial diameter = 0.018 μm Aspect ratio = 6.1 Hc = 1820 Oe σs = 135.0 emu/g pH value = 9.5 | 5.0 | 1.2 | 1873 | 0.88 | 237 | 5.4 | 135 | 1.24 | 8.3 | 6.8 |
| Ex. 93 | Ex. 63 | | 5.0 | 1.3 | 1856 | 0.89 | 228 | 5.8 | 143 | 1.31 | 8.6 | 6.5 |
| Ex. 94 | Ex. 64 | | 5.0 | 1.2 | 1881 | 0.89 | 221 | 6.0 | 141 | 1.35 | 3.2 | 1.6 |
| Ex. 95 | Ex. 65 | | 5.0 | 1.4 | 1873 | 0.89 | 246 | 6.0 | 145 | 1.38 | 6.5 | 3.5 |
| Ex. 96 | Ex. 66 | | 5.0 | 1.3 | 1891 | 0.89 | 231 | 6.0 | 124 | 1.23 | 4.8 | 6.8 |
| Ex. 97 | Ex. 67 | | 5.0 | 1.3 | 1910 | 0.88 | 216 | 6.6 | 143 | 1.21 | 8.8 | 8.9 |
| Ex. 98 | Ex. 68 | | 5.0 | 1.4 | 1829 | 0.87 | 223 | 6.2 | 148 | 1.29 | 7.8 | 6.3 |
| Ex. 99 | Ex. 69 | Major axial diameter = 0.10 μm Minor axial diameter = 0.017 μm Aspect ratio = 5.9 Hc = 2068 Oe σs = 141.1 emu/g pH value = 9.9 | 5.0 | 1.2 | 2112 | 0.87 | 219 | 6.4 | 146 | 1.27 | 6.9 | 7.2 |
| Ex. 100 | Ex. 70 | | 5.0 | 1.1 | 2089 | 0.86 | 228 | 6.0 | 144 | 1.36 | 7.8 | 7.8 |
| Ex. 101 | Ex. 71 | | 5.0 | 1.3 | 2106 | 0.87 | 235 | 5.6 | 126 | 1.16 | 5.6 | 4.4 |
| Ex. 102 | Ex. 72 | | 5.0 | 1.2 | 2132 | 0.87 | 235 | 5.8 | 124 | 1.12 | 2.8 | 1.6 |
| Ex. 103 | Ex. 73 | | 5.0 | 1.0 | 2075 | 0.88 | 216 | 6.4 | 134 | 1.25 | 9.4 | 9.0 |
| Ex. 104 | Ex. 74 | | 5.0 | 1.2 | 2100 | 0.88 | 221 | 6.8 | 138 | 1.28 | 6.8 | 5.5 |
| Ex. 105 | Ex. 75 | | 5.0 | 1.3 | 2071 | 0.87 | 206 | 7.2 | 146 | 1.38 | 4.9 | 2.5 |
| Ex. 106 | Ex. 76 | | 5.0 | 1.2 | 2120 | 0.88 | 210 | 7.0 | 148 | 1.40 | 6.8 | 5.6 |

TABLE 13

Magnetic recording medium using magnetic iron-based alloy particles

| | Kind of non-magnetic undercoat layer | Kind of magnetic iron-based alloy particles | Weight ratio of magnetic particles and resin (—) | Thickness of magnetic layer (μm) | Coercive force (Oe) | Br/Bm (—) | Gloss (%) | Ra (nm) | Young's modulus (relative value) | Linear absorption coefficient (μm⁻¹) | Corrosiveness | |
|---|---|---|---|---|---|---|---|---|---|---|---|---|
| | | | | | | | | | | | Rate of change in coercive force (%) | Rate of change in Bm (%) |
| Ex. 107 | Ex. 77 | Major axial diameter = 0.11 μm | 5.0 | 1.2 | 1882 | 0.90 | 240 | 5.4 | 138 | 1.25 | 7.8 | 5.3 |
| Ex. 108 | Ex. 78 | | 5.0 | 1.2 | 1896 | 0.89 | 235 | 5.6 | 140 | 1.33 | 7.9 | 4.8 |
| Ex. 109 | Ex. 79 | | 5.0 | 1.3 | 1901 | 0.89 | 230 | 5.6 | 142 | 1.36 | 3.3 | 1.5 |
| Ex. 110 | Ex. 80 | Minor axial diameter = 0.018 μm | 5.0 | 1.2 | 1878 | 0.89 | 247 | 5.4 | 145 | 1.38 | 6.0 | 3.3 |
| Ex. 111 | Ex. 81 | | 5.0 | 1.2 | 1865 | 0.88 | 236 | 5.8 | 126 | 1.25 | 4.6 | 5.6 |
| Ex. 112 | Ex. 82 | | 5.0 | 1.3 | 1873 | 0.89 | 225 | 6.2 | 143 | 1.23 | 8.8 | 7.2 |
| Ex. 113 | Ex. 83 | Aspect ratio = 6.1 Hc = 1820 Oe σs = 135.0 emu/g pH value = 9.5 | 5.0 | 1.3 | 1886 | 0.90 | 226 | 6.2 | 145 | 1.30 | 7.4 | 6.0 |
| Ex. 114 | Ex. 84 | Major axial diameter = 0.10 μm | 5.0 | 1.4 | 2158 | 0.89 | 221 | 6.2 | 148 | 1.29 | 6.5 | 7.2 |
| Ex. 115 | Ex. 85 | | 5.0 | 1.2 | 2163 | 0.89 | 238 | 5.6 | 146 | 1.38 | 7.5 | 7.2 |
| Ex. 116 | Ex. 86 | | 5.0 | 1.1 | 2096 | 0.88 | 240 | 5.6 | 130 | 1.20 | 5.8 | 4.0 |
| Ex. 117 | Ex. 87 | Minor axial diameter = 0.017 μm | 5.0 | 1.2 | 2116 | 0.89 | 242 | 5.6 | 131 | 1.15 | 2.8 | 1.8 |
| Ex. 118 | Ex. 88 | | 5.0 | 1.2 | 2103 | 0.88 | 230 | 6.0 | 138 | 1.28 | 9.0 | 8.2 |
| Ex. 119 | Ex. 89 | | 5.0 | 1.3 | 2121 | 0.87 | 232 | 6.6 | 145 | 1.29 | 6.6 | 5.3 |
| Ex. 120 | Ex. 90 | Aspect ratio = 5.9 Hc = 2068 Oe σS = 141.1 emu/g pH value = 9.9 | 5.0 | 1.1 | 2138 | 0.88 | 218 | 6.8 | 153 | 1.37 | 4.8 | 2.6 |
| Ex. 121 | Ex. 91 | | 5.0 | 1.2 | 2140 | 0.88 | 223 | 6.8 | 160 | 1.40 | 6.6 | 5.0 |

TABLE 14

Magnetic recording medium using magnetic iron-based alloy particles

| | Kind of non-magnetic undercoat layer | Kind of magnetic iron-based alloy particles | Weight ratio of magnetic particles and resin (—) | Thickness of magnetic layer (μm) | Coercive force (Oe) | Br/Bm (—) | Gloss (%) | Ra (nm) | Young's modulus (relative value) | Linear absorption coefficient (μm⁻¹) | Corrosiveness | |
|---|---|---|---|---|---|---|---|---|---|---|---|---|
| | | | | | | | | | | | Rate of change coercive force (%) | Rate of change in Bm (%) |
| Comp. Ex. 51 | Comp. Ex. 36 | Major axial diameter = 0.11 μm Minor axial diameter = 0.018 μm Aspect ratio = 6.1 Hc = 1820 Oe δs = 135.0 emu/g pH value = 9.5 | 5.0 | 1.0 | 1790 | 0.78 | 103 | 51.2 | 77 | 0.78 | 41.5 | 23.3 |
| Comp. Ex. 52 | Comp. Ex. 37 | | 5.0 | 1.4 | 1801 | 0.80 | 116 | 48.8 | 84 | 0.87 | 38.8 | 19.6 |
| Comp. Ex. 53 | Comp. Ex. 38 | | 5.0 | 1.5 | 1810 | 0.80 | 124 | 36.5 | 86 | 0.90 | 48.6 | 31.0 |
| Comp. Ex. 54 | Comp. Ex. 39 | | 5.0 | 1.2 | 1831 | 0.79 | 120 | 42.6 | 90 | 0.90 | 32.2 | 21.6 |
| Comp. Ex. 55 | Comp. Ex. 40 | | 5.0 | 1.2 | 1856 | 0.83 | 156 | 28.8 | 100 | 1.07 | 28.6 | 25.4 |
| Comp. Ex. 56 | Comp. Ex. 41 | | 5.0 | 1.2 | 1872 | 0.83 | 176 | 15.6 | 119 | 1.20 | 31.6 | 21.6 |
| Comp. Ex. 57 | Comp. Ex. 42 | | 5.0 | 1.2 | 1880 | 0.86 | 186 | 10.4 | 117 | 1.18 | 18.5 | 19.6 |
| Comp. Ex. 58 | Comp. Ex. 43 | | 5.0 | 1.1 | 1861 | 0.87 | 190 | 10.0 | 125 | 1.18 | 13.1 | 15.3 |
| Comp. Ex. 59 | Comp. Ex. 44 | | 5.0 | 1.2 | 1891 | 0.88 | 192 | 11.0 | 127 | 1.20 | 11.8 | 11.2 |
| Comp. Ex. 60 | Comp. Ex. 45 | | 5.0 | 1.1 | 1871 | 0.87 | 172 | 15.6 | 111 | 1.06 | 15.6 | 13.6 |
| Comp. Ex. 61 | Comp. Ex. 46 | | 5.0 | 1.2 | 1865 | 0.84 | 167 | 21.6 | 115 | 1.04 | 35.6 | 21.8 |
| Comp. Ex. 62 | Comp. Ex. 47 | | 5.0 | 1.1 | 1856 | 0.86 | 188 | 13.8 | 121 | 1.12 | 18.8 | 15.3 |
| Comp. Ex. 63 | Comp. Ex. 48 | | 5.0 | 1.2 | 1888 | 0.87 | 188 | 12.8 | 122 | 1.14 | 19.8 | 15.6 |
| Comp. Ex. 64 | Comp. Ex. 49 | | 5.0 | 1.2 | 1889 | 0.36 | 196 | 11.6 | 113 | 1.18 | 16.5 | 13.2 |
| Comp. Ex. 65 | Comp. Ex. 50 | | 5.0 | 1.2 | 1858 | 0.83 | 176 | 13.8 | 104 | 1.00 | 12.1 | 10.8 |

What is claimed is:

1. Hematite particles for a non-magnetic undercoat layer for a magnetic recording medium, comprising: acicular hematite particles having an average major axial diameter of not more than 0.3 μm, a major axial diameter distribution in geometrical standard of not more than 1.50 and a BET specific surface area of not less than 35 m$^2$/g, showing a pH of not less than 8, and containing soluble sodium salt of not more than 300 ppm, calculated as Na, and containing soluble sulfate of not more than 150 ppm, calculated as SO$_4$.

2. Hematite particles according to claim 1, further comprising an aluminum oxide, an aluminum hydroxide, a silicon oxide, a silicon hydroxide or a mixture thereof coated on the surface of the acicular hematite particles.

3. Hematite particles according to claim 2, wherein the amount of the aluminum coating is 0.01 to 50 wt %, calculated as Al, based on the weight of said hematite particles, and the amount of silicon coating is 0.01 to 50 wt %, calculated as SiO$_2$, based on the weight of said hematite particles.

4. Hematite particles according to claim 1, further having an aspect ratio of 2:1 to 20:1.

5. Hematite particles according to claim 1, wherein said acicular hematite particles have an average major axial diameter of 0.005 to 0.2 μm, a minor axial diameter of 0.0025 to 0.15 μm, an aspect ratio of 3:1 to 10:1, a major axial diameter distribution in geometrical standard of 1.01 to 1.40, a BET specific surface area of 40 to 150 m$^2$/g, a degree of densification of 0.5 to 2.5, the content of said soluble sodium of not more than 250 ppm, calculated as Na, and the content of said soluble sulfate of not more than 70 ppm, calculated as SO$_4$, and show a pH of 8.5 to 12.

6. A non-magnetic undercoat layer for a magnetic recording medium having a magnetic recording layer containing magnetic iron-based alloy particles and formed on the non-magnetic substrate, comprising:
hematite particles defined in claim 1; and
a binder resin.

7. A non-magnetic undercoat layer according to claim 6, wherein the amount of said hematite particles is 5 to 2000 parts by weight based on 100 parts by weight of the binder resin.

8. A non-magnetic undercoat layer according to claim 6, wherein the thickness of said non-magnetic undercoat layer is 0.2 to 10.0 μm.

9. A non-magnetic undercoat layer for a magnetic recording medium having a magnetic recording layer containing magnetic iron-based alloy particles and formed on the non-magnetic substrate, comprising:
hematite particles defined in claim 2; and
a binder resin.

10. A non-magnetic undercoat layer according to claim 9, wherein the amount of said hematite particles are 5 to 2000 parts by weight based on 100 parts by weight of the binder resin.

11. A non-magnetic undercoat layer according to claim 9, wherein the thickness of said non-magnetic undercoat layer is 0.2 to 10.0 μm.

12. A magnetic recording medium comprising:
a non-magnetic substrate;
a non-magnetic undercoat layer according to claim 6 which is formed on said non-magnetic substrate; and
a magnetic recording layer containing magnetic iron-based alloy particles and a binder resin, and formed on said non-magnetic undercoat layer.

13. A magnetic recording medium according to claim 12, wherein the content of said iron in said magnetic iron-based alloy particles is 50 to 99 wt %.

14. A magnetic recording medium according to claim 12, wherein the average major particle diameter of said magnetic iron-based alloy particles is 0.03 to 0.30 μm, and the aspect ratio thereof is 3:1 to 15:1.

15. A magnetic recording medium comprising:
a non-magnetic substrate;
a non-magnetic undercoat layer according to claim 9 which is formed on said non-magnetic substrate; and
a magnetic recording layer containing magnetic iron-based alloy particles and a binder resin, and formed on said non-magnetic undercoat layer.

16. A magnetic recording medium according to claim 15, wherein the content of said iron in said magnetic iron-based alloy particles is 50 to 99 wt %.

17. A magnetic recording medium according to claim 15, wherein the average major particle diameter of said magnetic iron-based alloy particles is 0.03 to 0.30 μm, and the aspect ratio thereof is 3 to 15:1.

18. A magnetic recording medium according to claim 15, wherein a corrosiveness represented by a percentage of change in the coercive force of the magnetic recording medium is not more than 10% and a corrosiveness represented by a percentage of change in saturated magnetic flux density of the magnetic recording medium is not more than 10%.

19. A process for producing hematite particles defined in claim 1, comprising the steps of:
dehydrating acicular goethite particles with the surfaces coated with a sintering preventive;
heating said goethite particles at a temperature of not less than 550° C. to obtain acicular hematite particles;
after slurrying said high density acicular hematite particles, pulverizing coarse particles in said high density acicular hematite particles by wet pulverization;
after adjusting a pH of the slurry to not less than 13, heat-treating said hematite particles in the slurry at a temperature of not less than 80° C.; and
filtering out, washing with water, and drying said hematite particles.

20. A process for producing hematite particles defined in claim 2, comprising the steps of:
washing hematite particles obtained by heat-treatment defined in claim 18, with water; and
treating the thus-obtained hematite particles with an aqueous solution containing an aluminum compound, a silicon compound and both an aluminum compound and a silicon compound, thereby coating the surfaces of said hematite particles with an aluminum oxide, a silicon oxide, an aluminum hydroxide, a silicon hydroxide, or a mixture thereof.

* * * * *